United States Patent
Ogura et al.

(10) Patent No.: US 6,590,937 B1
(45) Date of Patent: Jul. 8, 2003

(54) EFFICIENT MOTION VECTOR DETECTION

(75) Inventors: Eiji Ogura, Saitama (JP); Masatoshi Takashima, Tokyo (JP); Keitaro Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/283,830

(22) Filed: Aug. 1, 1994

(30) Foreign Application Priority Data

Aug. 3, 1993 (JP) .............................................. 5-210996
Feb. 17, 1994 (JP) ............................................ 6-043131

(51) Int. Cl.$^7$ .............................................. H04N 7/18
(52) U.S. Cl. .............................. 375/240.16; 375/240.17
(58) Field of Search ................................ 348/402, 415, 348/419, 410, 409, 699, 151, 152, 153, 416, 411, 405, 412, 413, 700; 375/240.1–240.17

(56) References Cited

U.S. PATENT DOCUMENTS

| | | | | |
|---|---|---|---|---|
| 4,980,764 A | | 12/1990 | Henot ......................... 348/412 |
| 5,142,361 A | * | 8/1992 | Tayama et al. ............. 348/410 |
| 5,200,820 A | * | 4/1993 | Gharavi ...................... 358/103 |
| 5,235,419 A | * | 8/1993 | Krause ........................ 358/135 |
| 5,278,663 A | * | 1/1994 | Hong .......................... 348/699 |
| 5,289,274 A | * | 2/1994 | Kondo ........................ 348/699 |
| 5,351,095 A | * | 9/1994 | Kerdranvat ................. 348/416 |
| 5,357,287 A | * | 10/1994 | Koo et al. ................... 348/699 |
| 5,361,104 A | * | 11/1994 | Ohki .......................... 348/411 |
| 5,386,248 A | * | 1/1995 | De Haan et al. ............ 348/415 |
| 5,398,078 A | * | 3/1995 | Masuda et al. ............. 348/405 |
| 5,398,079 A | * | 3/1995 | Liu et al. .................... 348/411 |
| 5,410,358 A | * | 4/1995 | Shackleton et al. ......... 348/412 |
| 5,430,886 A | * | 7/1995 | Furtek ........................ 348/699 |
| 5,485,214 A | * | 1/1996 | Lin ............................. 348/416 |
| 5,502,492 A | * | 3/1996 | Jung .......................... 348/699 |

FOREIGN PATENT DOCUMENTS

EP 0 510 972 10/1992

OTHER PUBLICATIONS

Patent Abstracts of Japan vol. 14, No. 234 (E–0929), May 17, 1990, JP–A–02 062108 (Fujitsu Limited) Mar. 2, 1990, *abstract*.
GLOBECOM '92 vol. 1, Dec. 1992 Orlando, FLA., US., pp. 320–324, XP 000357803 Lee et al. 'A Fast Feature Matching Algorithm Of Multi–Resolution Motion Estimation' *the whole document*.

* cited by examiner

Primary Examiner—Andy Rao
(74) Attorney, Agent, or Firm—Frommer Lawrence & Haug LLP; William S. Frommer

(57) ABSTRACT

A reference block is divided in the horizontal direction into small blocks, and is also divided in the vertical direction into small blocks. Feature values representing each of the small blocks formed from the reference block are obtained. Similarly, a check block is divided in the horizontal and vertical directions into small blocks and feature values representing the small blocks formed from the check block are obtained. The feature values in the horizontal direction of the reference and check blocks are compared, and the feature values in the vertical direction of the reference and check blocks are compared. The results of the two comparisons comprise an evaluation value by which the degree of matching of the reference and check blocks is evaluated. The check block is moved throughout a predetermined search range, and the process is repeated for each position of the check block. A motion vector is produced between the reference block and the check block position at which the check block best matches the reference block.

28 Claims, 25 Drawing Sheets

● $D_{-1-1}$　　　● $D_{0-1}$　　　● $D_{1-1}$

○ $H_{-\frac{1}{2}-\frac{1}{2}}$　× $H_{0-\frac{1}{2}}$　○ $H_{\frac{1}{2}-\frac{1}{2}}$ ● $D_{-10}$　× $H_{-\frac{1}{2}0}$　● $D_{00}$　× $H_{\frac{1}{2}0}$　● $D_{10}$ ○ $H_{-\frac{1}{2}\frac{1}{2}}$　× $H_{0\frac{1}{2}}$　○ $H_{\frac{1}{2}\frac{1}{2}}$

● $D_{-11}$　　　● $D_{01}$　　　○ $D_{11}$

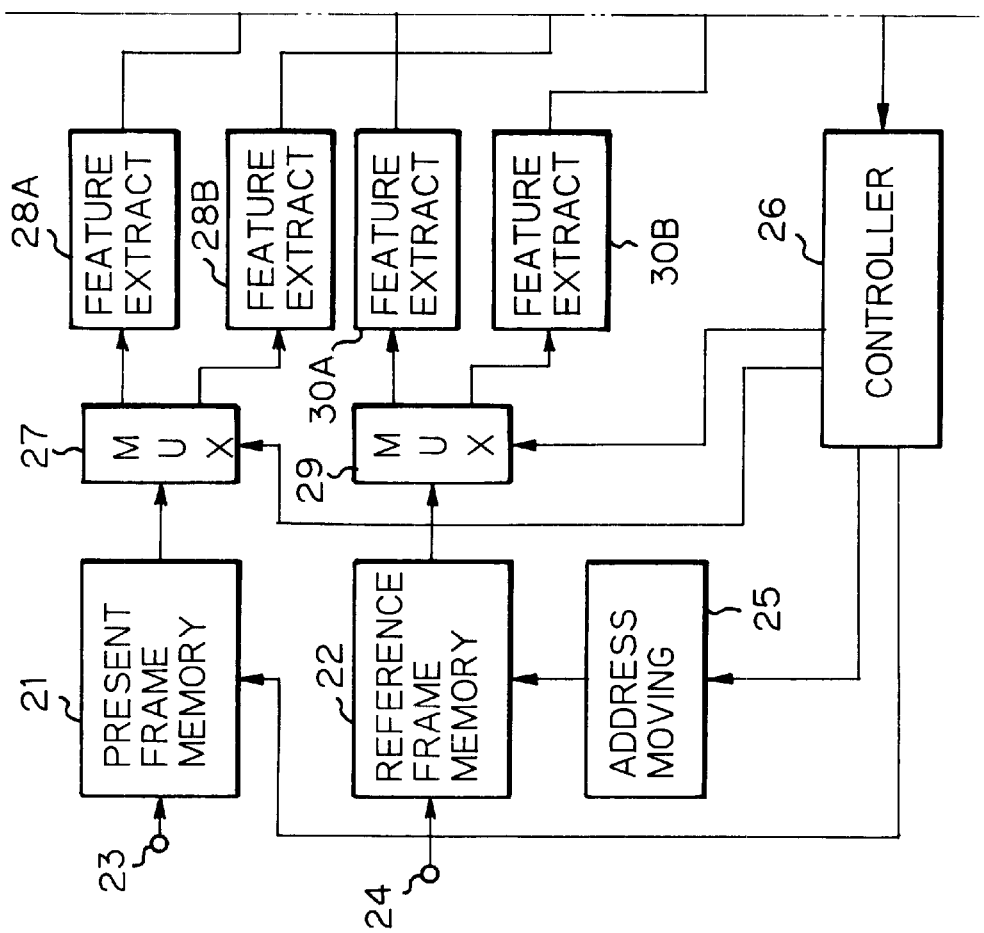

Fig. 15

| | | | | |
|---|---|---|---|---|
| A(1,1) ○ | A(1,2) ○ | A(1,3) ○ | ----- | A(1,16) ○ | → ha1
| A(2,1) ○ | A(2,2) ○ | A(2,3) ○ | ----- | A(2,16) ○ | → ha2
| A(3,1) ○ | A(3,2) ○ | A(3,3) ○ | ----- | A(3,16) ○ | → ha3
| ⋮ | ⋮ | ⋮ | | ⋮ |
| A(16,1) ○ | A(16,2) ○ | A(16,3) ○ | ----- | A(16,16) ○ | → ha16

| | | | | |
|---|---|---|---|---|
| B(1,1) ○ | B(1,2) ○ | B(1,3) ○ | ----- | B(1,16) ○ | → hb1
| B(2,1) ○ | B(2,2) ○ | B(2,3) ○ | ----- | B(2,16) ○ | → hb2
| B(3,1) ○ | B(3,2) ○ | B(3,3) ○ | ----- | B(3,16) ○ | → hb3
| ⋮ | ⋮ | ⋮ | | ⋮ |
| B(16,1) ○ | B(16,2) ○ | B(16,3) ○ | ----- | B(16,4) ○ | → ha1

↓ vb1  ↓ vb2  ↓ vb3      ↓ vb16

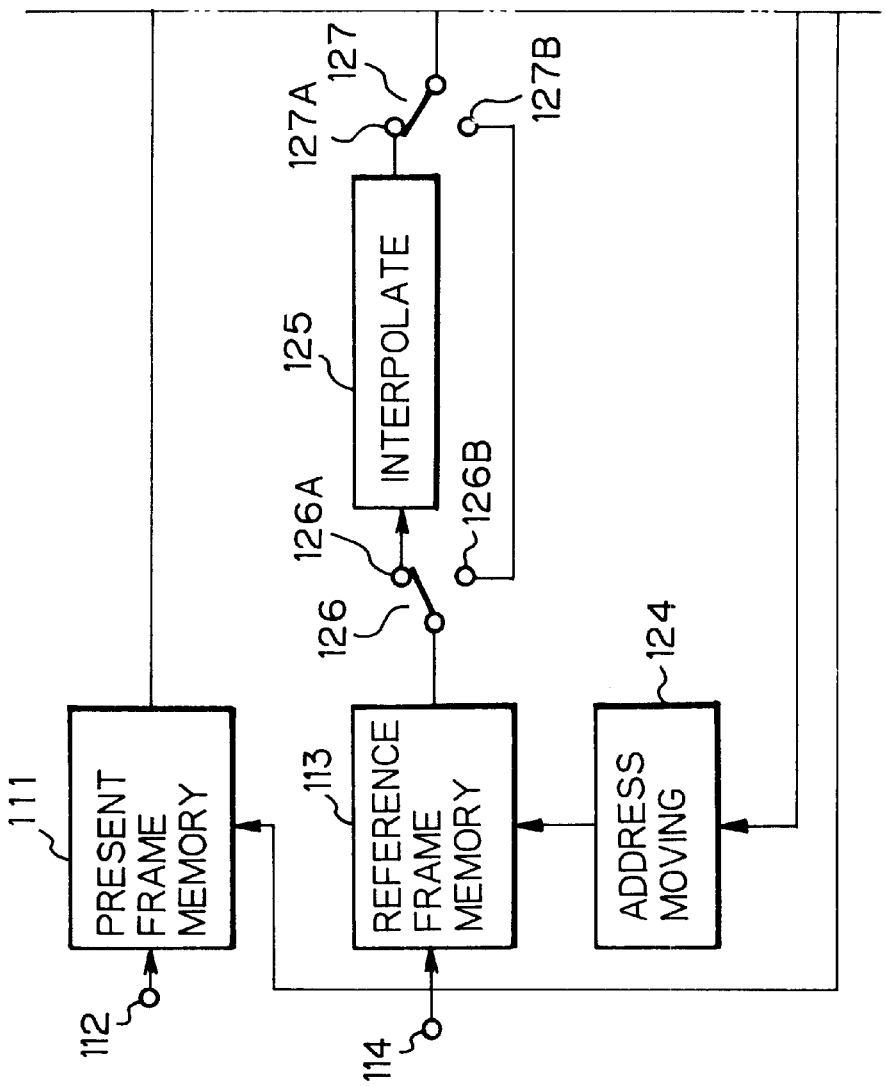

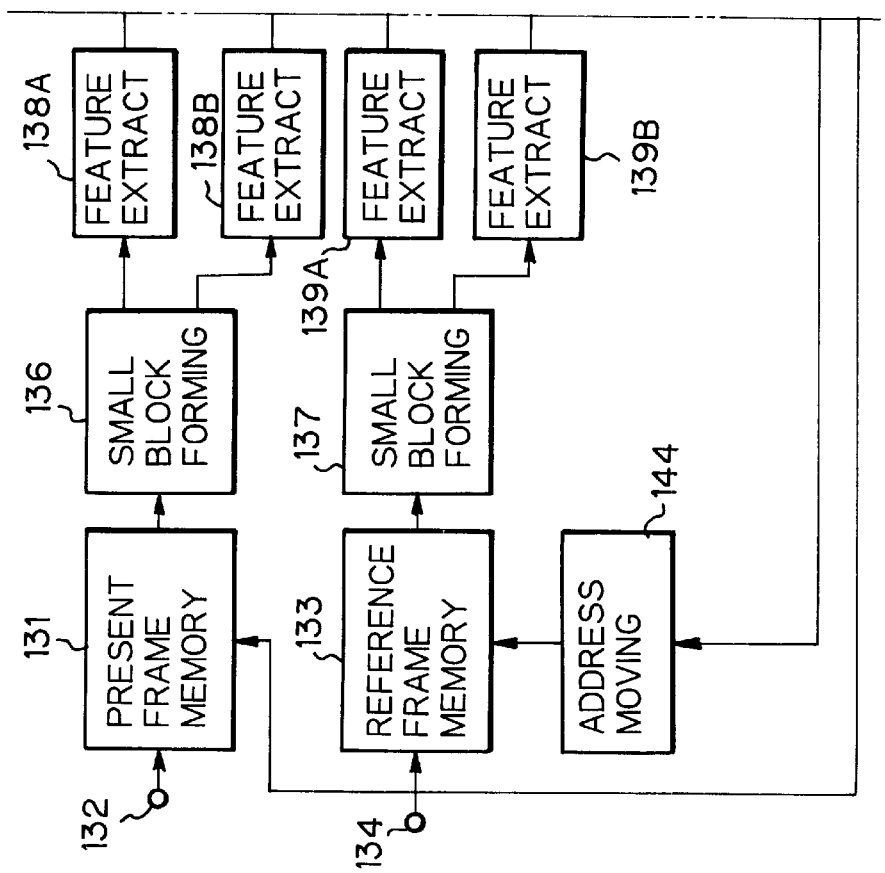

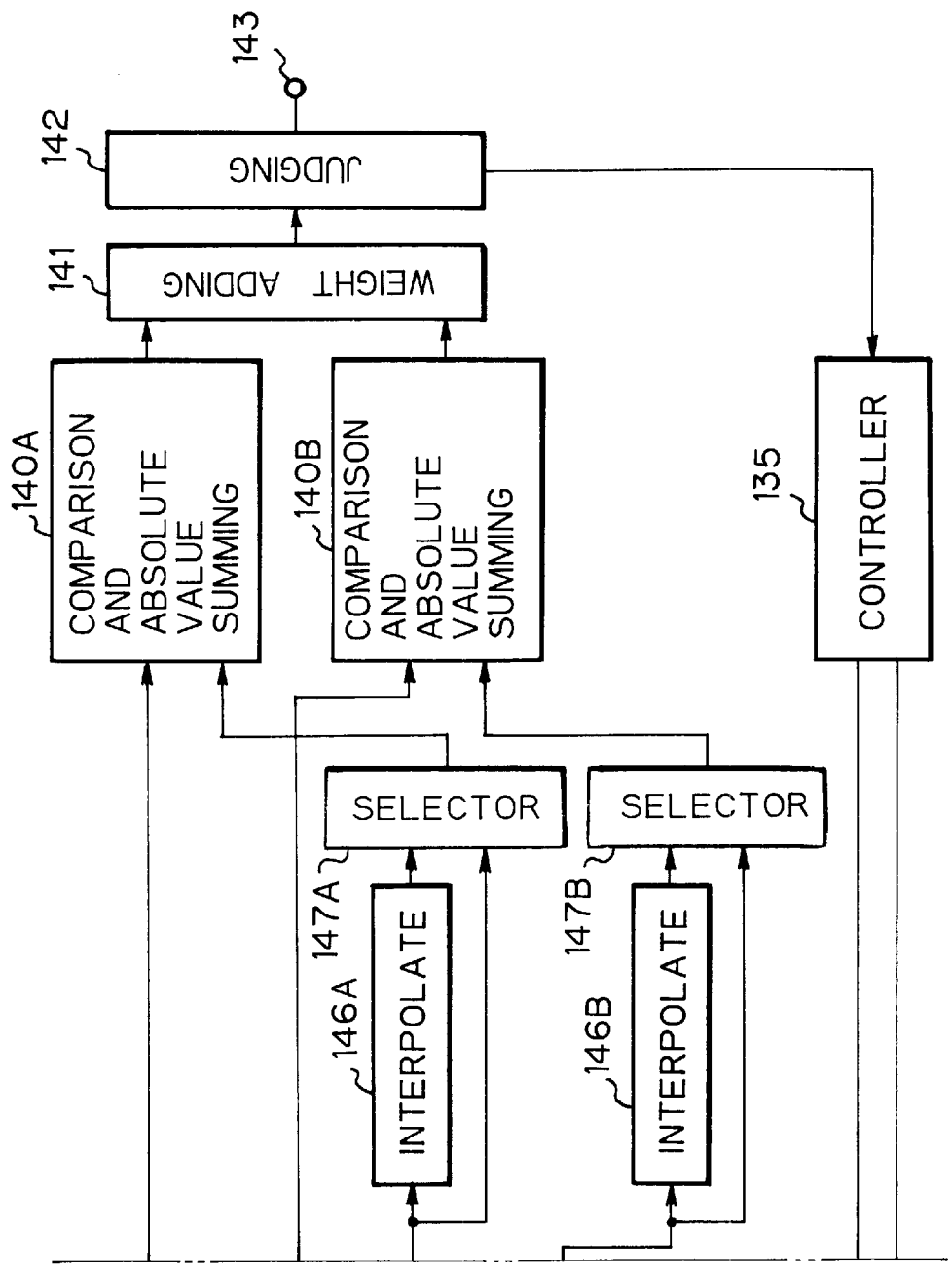

ured difference data to produce predicted image data of the present frame and supplies the predicted present frame image data to the frame memory 205 which stores the predicted present frame image data as a next reference frame.

EFFICIENT MOTION VECTOR DETECTION

BACKGROUND OF THE INVENTION

The present invention relates to detection of motion vectors between two images, and, more particularly, is directed to efficient detection of motion vectors.

An example of a system in which motion vector detection is useful is a system according to the Moving Picture Coding Experts Group (MPEG) standard, which is concerned with high efficiency compression coding of a moving image. In the MPEG standard, an image is encoded using discrete cosine transformation (DCT) and predictive encoding with motion compensation. Motion vectors are used during motion compensation.

FIG. 1 shows an example of an apparatus according to the MPEG standard. Image data, also referred to as pixel data, is supplied to an input terminal 201, which applies the image data to a motion vector detecting circuit 202 and to a subtracting circuit 203.

The motion vector detecting circuit 202 produces motion vectors for a present frame relative to a reference frame, and supplies these motion vectors to a motion compensating circuit 204 which applies the motion vectors to the reference frame stored in frame memory 205 to generate motion compensated image data. That is, the circuit 204 performs motion compensation on the reference frame read from frame memory 205 using the motion vectors from circuit 202. The circuit 204 supplies the motion compensated image data to the subtracting circuit 203 and to an adding circuit 206.

The subtracting circuit 203 functions to subtract the motion compensated image data of the reference frame from the image data of the present frame supplied from input terminal 201 to produce difference data, and to supply the difference data to a DCT circuit 207.

The DCT circuit 207 operates to transform the difference data to produce coefficient data, and to supply the coefficient data to a quantizer 208 which functions to quantize the coefficient data and to supply quantized data to an output terminal 209 and to an inverse quantizer 210.

The inverse quantizer 210 dequantizes the quantized data supplied thereto to produce recovered coefficient data, and applies the recovered coefficient data to an inverse DCT circuit 211 which inverse transforms the recovered coefficient data to produce recovered difference data and supplies the recovered difference data to the adding circuit 206. The adding circuit 206 adds the motion compensated image data of the reference frame to the recov- Three conventional methods for producing motion vectors are explained below. Generally, a portion or block of the present frame is selected, and the closest matching block from the reference frame is determined. A motion vector for the block of the present frame is the difference between the co-ordinates of the block of the present frame and the co-ordinates of the closest matching block of the reference frame. The motion vector detecting circuit 202 may use any of the three conventional methods which are referred to herein as a full search method, a multistep method and an interpolating method. The full search and multistep methods produce a motion vector having a resolution of one pixel. The interpolating method produces a motion vector having a resolution of better than one pixel.

The full search method of producing motion vectors will now be explained.

FIG. 2 shows a present frame 221 and a reference frame 222. Present frame 221 is shown as including a reference block 223. Reference frame 222 is shown as including a check block 224. The check block 224 is moved in a predetermined search range, and a degree of matching between the reference block 223 and the check block 224 is detected for each position of the check block 224 in the predetermined search range. A matching block is defined as the position where the check block has the best degree of matching to the reference block, and the motion vector for the reference block is set to indicate the matching block.

FIG. 3 shows an example of a conventional motion vector detecting apparatus which obtains motion vectors using the full search method. Image data of the present frame is supplied to an input terminal 233 which applies the present frame image data to a present frame memory 231. Image data of the reference frame is supplied to an input terminal 234 which applies the reference frame image data to a reference frame memory 232. Controller 235 controls reading and writing of the present and reference frame memories 231, 232.

Pixel data of the reference block of the present frame is read from the present frame memory 231. Pixel data of the check block of the reference frame is read from the reference frame memory 232. An address moving circuit 236 generates address data for reading the check block pixel data so that the check block moves, pixel by pixel, in the predetermined vector search range.

FIG. 4 shows a check block 241 being moved in the predetermined vector search range SV. Initially, the check block is positioned in the upper left corner of the search range, and a sum of differences is obtained, as explained below. Then, the check block is moved to the right by one pixel, and a sum of differences is obtained. The check block is again moved to the right by one pixel and a sum is obtained until it has reached the rightmost boundary of the search range. Then, the check block is positioned in the upper left corner of the search range, moved downward by one pixel, and a sum is obtained. The check block is moved to the right by one pixel and a sum is obtained at that position, until it has reached the rightmost boundary of the search range. Again, the check block is moved to the leftmost boundary, but downwards by two pixels from the upper left corner, and a sum is obtained. This procedure is repeated until the check block has been moved through the entire search range.

The reference block pixel data and the check block pixel data are supplied to a differential circuit 237 which subtracts these data and applies the resulting difference value to an absolute value summing circuit 238. The absolute value summing circuit 238 accumulates the difference values as a sum of absolute values of the difference values, for each of the pixel positions in the reference block, and supplies the sum to a judging circuit 239. That is, at each position of the check block in the predetermined search range SV, the summing circuit 238 obtains a sum of difference values.

The sum of differences may be represented by the following equation:

$$E = \sum_{i=1}^{M \times N} (W_i \times |A_i - B_i|) \qquad \text{(eq. 1)}$$

where (M×N) represents the size of each of the reference block and check block, $A_i$ represents the pixels of the reference block, $B_i$ represents the pixels of the check block, and $W_i$ represents a weighting factor.

Alternatively, instead of the absolute value of the difference, the squared value of the difference could be used in equation 1.

The judging circuit 239 selects the check block position corresponding to the minimum sum of difference values as the matching block, calculates the motion vector between the reference block and the matching block, and supplies the motion vector to an output terminal 240.

Because the full search method proceeds by moving the check block on a pixel-by-pixel basis in the predetermined search range, a large amount of computation is required to obtain a motion vector using this method. However, this method always finds the best matching block in the predetermined search range.

The multistep method of producing motion vectors will now be explained.

The first step of the multistep method proceeds in the same manner as the full search method, except that the check block is moved by (i) pixels, i>1, instead of by one pixel. Each succeeding step of the multistep method proceeds in the same manner as the full search method, with the resolution getting finer and the search range smaller and centered on the best matching block from the previous step, until in the last step of the multistep method, the check block is moved by one pixel through the final search range which is smaller than the original search range.

FIG. 5 shows an example of a conventional motion vector detecting apparatus which obtains motion vectors using the multistep method. Image data of the present frame is supplied to an input terminal 253 which applies the present frame image data to a present frame memory 251. Image data of the reference frame is supplied to an input terminal 254 which applies the reference frame image data to a reference frame memory 252. Controller 255 controls reading and writing of the present and reference frame memories 251, 252.

Pixel data of the reference block of the present frame is read from the present frame memory 251. Pixel data of the check block of the reference frame is read from the reference frame memory 252. An address moving circuit 256A generates address data for reading the check block pixel data so that the check block moves in a first step, for example, by two pixels at each readout, in the predetermined vector search range.

The reference block pixel data and the check block pixel data are supplied to a differential circuit 257 which subtracts these data and applies the resulting difference value to an absolute value summing circuit 258. The absolute value summing circuit 258 accumulates the difference values as a sum of absolute values of the difference values, for each of the pixel positions in the reference block, and supplies the sum to a judging circuit 259.

The judging circuit 259 selects the check block position corresponding to the minimum sum of difference values as the matching block for the first step, calculates a coarse motion vector between the reference block and the matching block.

Then, in the second step, check block pixel data is again read from the reference frame memory 254, but readout is controlled by address moving circuit 256B so that the check block moves pixel by pixel in a search range centered on the best matching block from the first step. The judging circuit 259 selects the check block position corresponding to the minimum sum of difference values as the matching block for the second step, calculates a fine motion vector between the reference block and the matching block, and supplies the fine motion vector to an output terminal 260.

FIG. 6 shows a check block 261 moved in the predetermined vector search range SV every (i) pixels (for example, two pixels). In the next step, the check block is moved every pixel at a location around such the best matching block from the first step. The multistep method may be used with three or more steps. For example, in a first step, the check block may be moved by four pixels, in a second step, the check block may be moved by two pixels and in a third step, the check block is moved by one pixel.

The multistep method requires fewer computations than the full search method, but may not find the best matching block in the predetermined search range. Specifically, when the coarse motion vector obtained in the first step is wrong, a correct motion vector cannot be obtained.

It has been proposed to, in the first step, enlarge a block of size (N×M) to (2N×2M), subsample to produce a block of size (N×M), and move the check block in the subsampled search range to obtain a coarse motion vector. However, this method is also not guaranteed to find the best motion vector in the original predetermined search range.

The interpolating method of producing motion vectors will now be explained.

The interpolating method proceeds in the same manner as the full search method, except that the pixels of the reference frame are interpolated, and the check block is moved at the interpolated resolution. For example, an interpolated pixel may be obtained between each pair of pixels in the search range of the reference frame, and the check block may be moved by one half of the original pixel resolution (one pixel of the interpolated resolution).

FIG. 7 shows an example of a conventional motion vector detecting apparatus which obtains motion vectors at a precision of better than one pixel using the interpolating method. Image data of the present frame is supplied to an input terminal 273 which applies the present frame image data to a present frame memory 271. Image data of the reference frame is supplied to an input terminal 274 which applies the reference frame image data to a reference frame memory 272. Controller 275 controls reading and writing of the present and reference frame memories 271, 272.

Pixel data of the reference block of the present frame is read from the present frame memory 271.

Data is read from the reference frame memory 272 and applied to an interpolating circuit 281 which interpolates adjacent readout pixels, also referred to as original pixels, to form interpolated pixels between the original pixels. The readout and interpolated pixel data form the pixel data of the check block.

FIG. 8 shows pixel data read from the memory 272 as filled-in circles (●). Interpolated data formed from two original pixels are shown as "x" (×). Interpolated data formed from four original pixels are shown as empty circles (○). For example, interpolated pixel data $H_{-1/2,0}$ is obtained as follows:

$$H_{-1/2,0} = (D_{-1,0} + D_{0,0})/2 \qquad \text{(eq. 2)}$$

Interpolated pixel data $H_{-1/2,-1/2}$ is obtained as follows:

$$H_{-1/2,-1/2} = (D_{-1,-1} + D_{0,-1} + D_{0,0} + D_{-1,0})/4 \qquad \text{(eq. 3)}$$

The reference block pixel data and the check block pixel data are supplied to a differential circuit 277 which subtracts these data and applies the resulting difference value to an absolute value summing circuit 278. The absolute value summing circuit 278 accumulates the difference values as a sum of absolute values of the difference values, for each of the pixel positions in the reference block, and supplies the sum to a judging circuit 279.

The judging circuit 279 selects the check block position corresponding to the minimum sum of difference values as the matching block, calculates the motion vector between the reference block and the matching block, and supplies the motion vector to an output terminal 280. Since the check block included pixels interpolated half way between the reference frame pixels, the motion vector has a precision of one half pixel, that is, a resolution of better than one pixel.

The interpolating method produces a motion vector at a higher resolution than the full search method, but requires more computation than the full search method.

In each of the above-described methods for detecting motion vectors, the amount of computation required is large. Therefore, an apparatus using any of these methods requires a large amount of hardware, takes a long time to operate and is expensive to construct.

There has also been proposed an apparatus in which projections in the horizontal and vertical directions of two blocks are independently performed and motion vectors are detected independently in the horizontal and vertical directions. However, since the projection in the horizontal direction and the projection in the vertical direction are independently used in this proposed method, its motion vector detection precision is poor.

OBJECTS AND SUMMARY OF THE INVENTION

Therefore, an object of the present invention is to provide a method and apparatus for detecting motion vectors which avoids the aforementioned disadvantages of the prior art.

Another object of the present invention to detect motion vectors more efficiently without deteriorating detection precision.

Yet another object of the present invention is to detect motion vectors using a simplified circuit design.

A further object of the present invention is to reduce the amount of calculation required to detect a motion vector.

In accordance with an aspect of this invention, a method and apparatus for detecting motion vectors stores and reads out a reference block having a first size, and forms the read out reference block into a first set of small blocks. A search range having a second size as least as large as the first size is stored and a portion of the stored search range is read out as a check block having the first size in response to a control signal which indicates different portions of the stored search range. The read out check block is formed into a second set of small blocks which are compared with the first set of small blocks to determine which of the check blocks read out from the search range best matches the reference block, and a motion vector is produced between the reference block and the best matching check block.

The first and second sets of small blocks are formed in at least two directions. The small blocks formed from the read out reference block in a first direction are compared with the small blocks formed from the read out check block in the first direction. The small blocks formed from the read out reference block in a second direction are compared with the small blocks formed from the read out check block in the second direction.

At least one feature value is generated for each of the small blocks in the first and second sets of small blocks. The feature values for the first and second sets of small blocks are compared.

When the first and second sets of small blocks are formed in at least two directions, and at least one feature value is generated for each of the small blocks formed in each of a first and second direction, then the small blocks formed from the read out reference block in the first direction are compared with the small blocks formed from the read out check block in the first direction, and the small blocks formed from the read out reference block in the second direction are compared with the small blocks formed from the read out check block in the second direction.

Thus, the amount of calculation used in detecting a motion vector can be reduced without substantially deteriorating the detection precision of the motion vector.

In a multistep method according to the present invention, coarse portions of the search range respectively differing by at least two pixels are indicated, and a coarse motion vector is produced in response to the check blocks read out from the coarse portions of the search range. Fine portions of a subset of the search range respectively differing by one pixel are indicated, and a fine motion vector is produced in response to the check blocks read out from the fine portions of the subset of the search range.

In an interpolating method according to the present invention, the pixels read out of the stored search range are interpolated to form interpolated pixels which are formed into the second set of small blocks so that the motion vector has a resolution of higher than one pixel.

In accordance with another aspect of this invention, a method and apparatus for detecting motion vectors stores and reads out a reference block having a first size, and generates at least one first feature value representing the read out reference block. A search range having a second size at least as large as the first size is stored and a portion of the stored search range is read out as a check block having the first size in response to a control signal which indicates different portions of the stored search range. At least one second feature value representing the read out check block is generated and compared with the at least one first feature value to determine which of the check blocks read out from the search range best matches the reference block, and a motion vector is produced between the reference block and the best matching check block.

In accordance with another aspect of this invention, a method and apparatus for detecting motion vectors stores and reads out first and second reference blocks, and generates at least one first feature value and at least one second feature value representing the read out first and second reference blocks, respectively. First and second search ranges are stored and a portion of one of the first and second search ranges is read out and at least one third feature value representing the read out portion of the search ranges is generated. The at least one first and third feature values are compared, and a first motion vector is produced as a function of this comparison. The at least one second and third feature values are compared, and a second motion vector is produced as a function of this comparison.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIG. 15 is a schematic diagram illustrating division of a reference block into small blocks in the vertical and horizontal directions;

FIG. 16 is a schematic diagram illustrating division of a check block into small blocks in the vertical and horizontal directions;

FIG. 30 is a block diagram of another motion vector detecting apparatus according to the present invention.

DETAILED DESCRIPTION OF THE PREFERRED EMBODIMENTS

According to the present invention, to efficiently detect motion vectors, each of the blocks of an image is divided into smaller blocks, and a feature value representing each small block is obtained. Because feature values for the small blocks of a reference block are compared with feature values for the small blocks of a check block, less computation is required as compared to the conventional methods for detecting motion vectors described above, namely, the full search, multistep and interpolating methods. That is, since a feature value represents all of the pixels in a small block, it requires less computation to compare feature values for the small blocks of the reference and check blocks than to compare each of the pixels of the reference and check blocks.

As a feature value representing a small block, for example, it is possible to use the value obtained by adding or averaging all of the pixels in the small block, the minimum and maximum values of the pixels in the small block, one or a plurality of coefficients which were obtained by Hadamard converting, DCT transforming, or wavelet converting the pixels in the small block, the maximum and minimum values of the coefficients obtained by Hadamard converting, DCT transforming, or wavelet converting the pixels in the small block, or other representative value or values.

Figure 9:
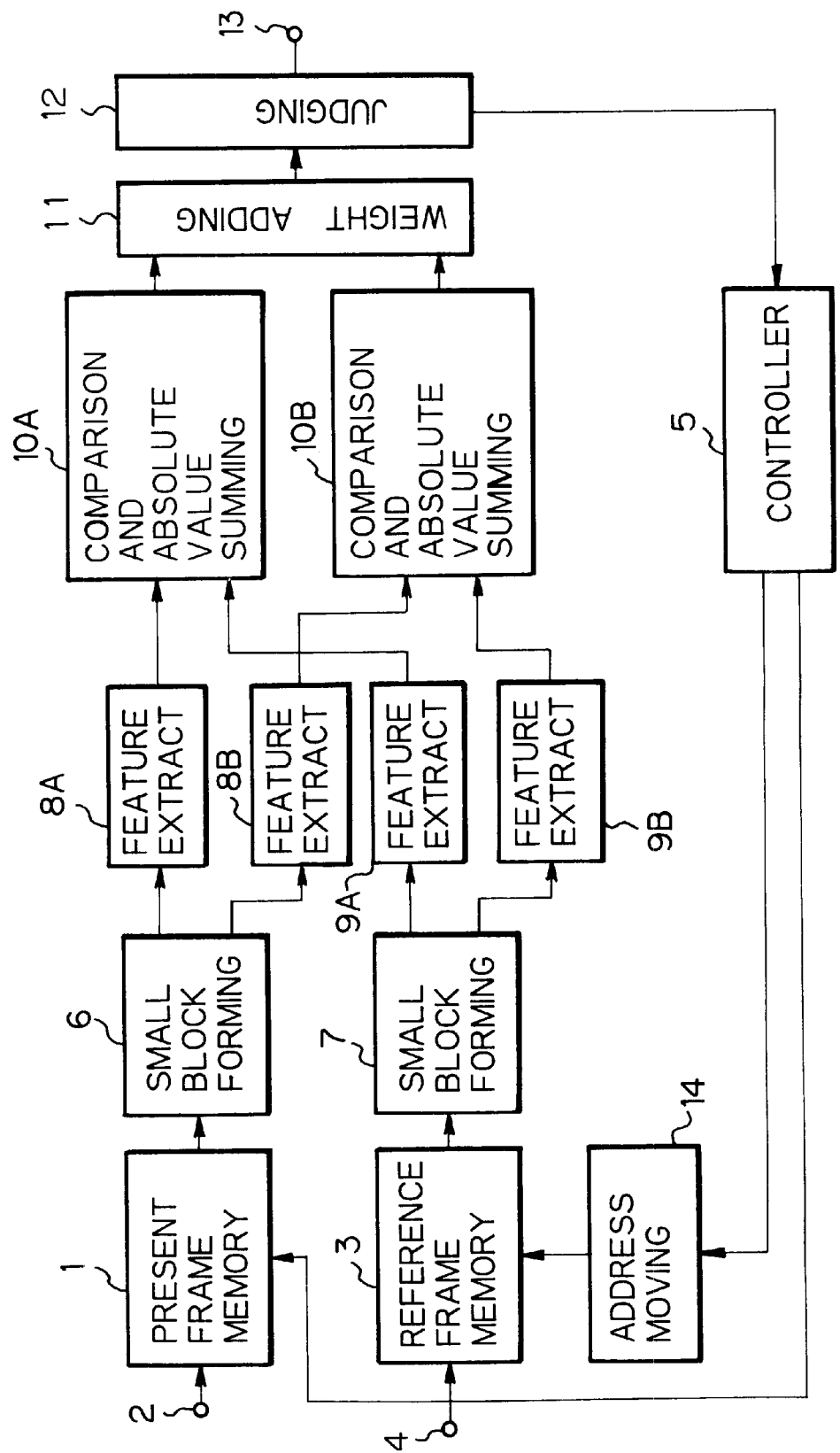
FIG. 9 is a block diagram of a motion vector detecting apparatus according to the present invention.

Referring now to the drawings, and in particular to FIG. 9, there is illustrated a motion vector detecting apparatus according to the present invention. The apparatus illustrated in FIG. 9 is adapted to store a present frame and a reference frame, to obtain a reference block from the present frame and a check block from the reference frame, and to vary the position of the check block within a predetermined search range in the reference frame. The apparatus of FIG. 9 is also adapted to form small blocks from each of the reference and check blocks, to obtain feature values for each of the small blocks and to compare the features values of the small blocks of the reference and check blocks. The check block position which corresponds to a best match between the feature values of the small blocks of the check block and the feature values of the small blocks of the reference block is chosen as the position of a matching block, and a motion vector is obtained between the reference block and the matching block.

The apparatus shown in FIG. 9 comprises input terminals 2, 4, present frame memory 1, reference frame memory 3, controller 5, small block forming circuits 6, 7, feature extracting circuits 8A, 8B, 9A, 9B, comparison and absolute value summing circuits 10A, 10B, weight adding circuit 11, judging circuit 12 and address moving circuit 14.

The apparatus of FIG. 9 uses a full search method for obtaining motion vectors, as modified by the present invention.

Image data of a present frame is supplied to an input terminal 2, and from the terminal 2 to present frame memory 1 which functions to store the present frame. Image data of a reference frame is supplied to an input terminal 4, and from the terminal 4 to reference frame memory 3 which functions to store the reference frame. Controller 5 controls reading and writing of the present and reference frame memories 1, 3.

The present frame memory 1 also functions to output image data of the present frame as a reference block of (N×M) pixels, for example, (16×16) pixels, and to supply the reference block to a small block forming circuit 6.

The reference frame memory 3 also functions to output image data of the reference frame as a check block of (N×M) pixels, and to supply the check block to a small block forming circuit 7. An address moving circuit 14 is operative to vary the readout address applied to the reference frame memory 3 so as to move the position of the check block in a predetermined vector search range every pixel.

The small block forming circuit 6 is adapted to divide the reference block into a plurality of small blocks. For example, the circuit 6 may divide the reference block into M blocks in the horizontal direction and may also divide a duplicate of the reference block into N blocks in the vertical direction. The circuit 6 is further adapted to supply the reference block, as divided into M small blocks in the horizontal direction, to a feature extracting circuit 8A, and to supply the reference block, as divided into N small blocks in the vertical direction, to a feature extracting circuit 8B.

Similarly, the small block forming circuit 7 is adapted to divide the check block into a plurality of small blocks, and to supply the check block, as divided into M small blocks in the horizontal direction, to a feature extracting circuit 9A, and to supply the check block, as divided into N small blocks in the vertical direction, to a feature extracting circuit 9B.

Each of the feature value extracting circuits 8A, 9A is operative to obtain one or more feature values for each of the small blocks supplied thereto, and to output the feature values to comparison and absolute value summing circuit 10A. Similarly, feature extracting circuits 8B, 9B are operative to obtain feature values and output the feature values to comparison and absolute value summing circuit 10B.

As a feature value representing a small block, for example, it is possible to use the value obtained by adding or averaging all of the pixels in the small block, the minimum and maximum values of the pixels in the small block, one or a plurality of coefficients which were obtained by Hadamard converting, DCT transforming, or wavelet converting the pixels in the small block, the maximum and minimum values of the coefficients obtained by Hadamard converting, DCT transforming, or wavelet converting the pixels in the small block, or other representative value or values.

Feature value extracting circuits 8A, 8B, 9A, 9B may comprise low pass filters.

Comparison and summing circuit 10A functions to obtain the sum of the absolute values of the differences between the feature values of the small blocks formed by dividing the reference block in the horizontal direction and the feature values of the small blocks formed by dividing the check block in the horizontal direction, and to supply this horizontal sum to weight adding circuit 11.

Comparison and absolute value summing circuit 10B functions to obtain the sum of the absolute values of the differences between the feature values of the small blocks formed by dividing the reference block in the vertical direction and the feature values of the small blocks formed by dividing the check block in the vertical direction, and to supply this vertical sum to weight adding circuit 11.

Instead of obtaining the absolute value sum of the differences, the square sum of the differences can be obtained by each of circuits 10A, 10B.

Weight adding circuit 11 is adapted to add the horizontal sum and the vertical sum and to weight the combined horizontal and vertical sum to form an evaluation value, and to supply the evaluation value to judging circuit 12. For example, the sum of horizontal differences may be weighted by a factor Wh, and the sum of vertical differences may be weighted by a factor Wv, Wh+Wv=1. For a still image, it is preferable to choose Wh=Wv=0.5. For a moving image with the majority of motion in the horizontal direction, the relationship should be Wh>Wv, for example, Wh=0.7 and Wv=0.3. The weights Wh, Wv may be adaptively chosen by a weight determining circuit (not shown), for example, for each image frame.

The check block is moved in the predetermined vector search range on a pixel by pixel basis, as explained above with respect to the conventional full search method. At each repositioning of the check block, the judging circuit 12 functions to compare the evaluation values for the positions of the check block within the predetermined search range. The judging circuit 12 determines the position of the check block corresponding to the minimum of the evaluation values, generates a motion vector between the reference block and the position of the check block corresponding to the minimum of the evaluation values, and supplies the motion vector to output terminal 13.

Figure 1:
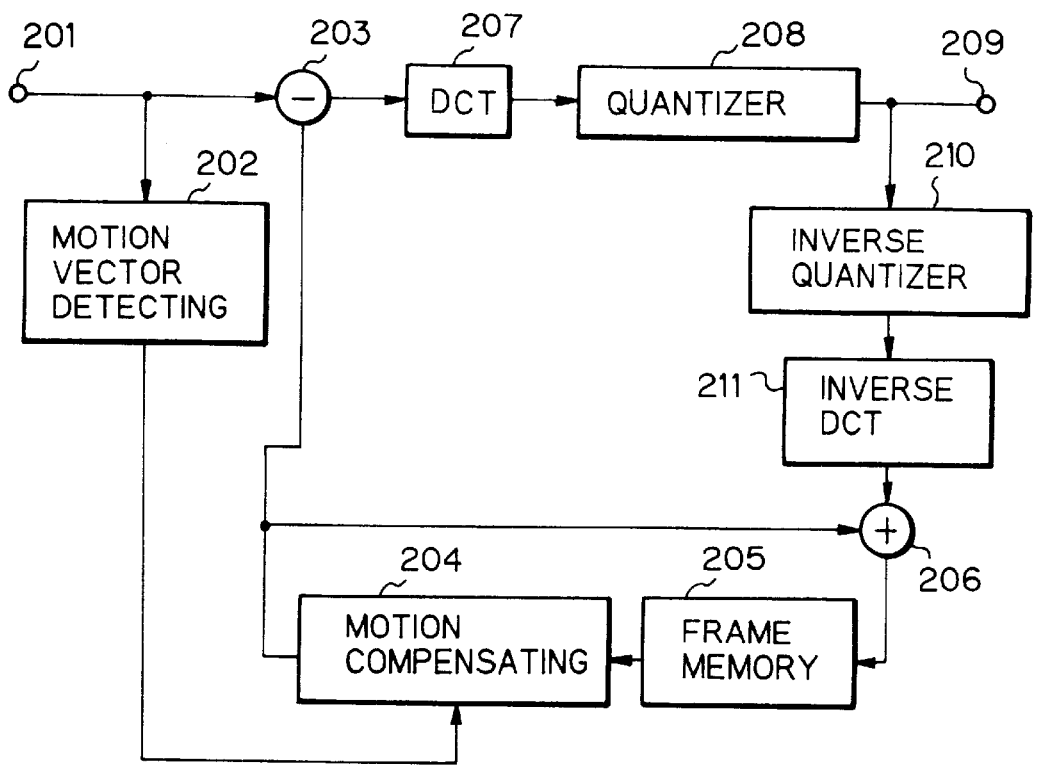
FIG. 1 is a block diagram of a conventional predictive coding apparatus using motion compensation.
Figure 2:
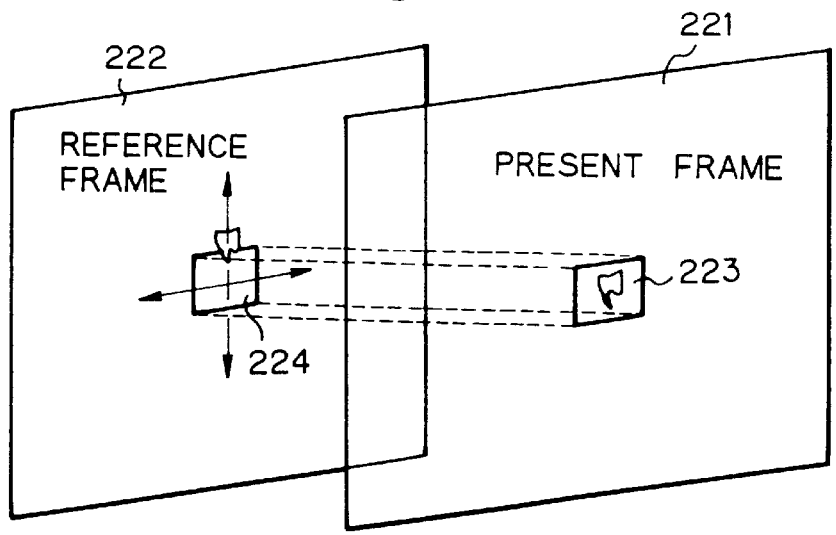
FIG. 2 is a schematic diagram showing the relationship between a reference frame, a present frame, a check block and a reference block, as used by the apparatus of FIG. 1.
Figure 3:
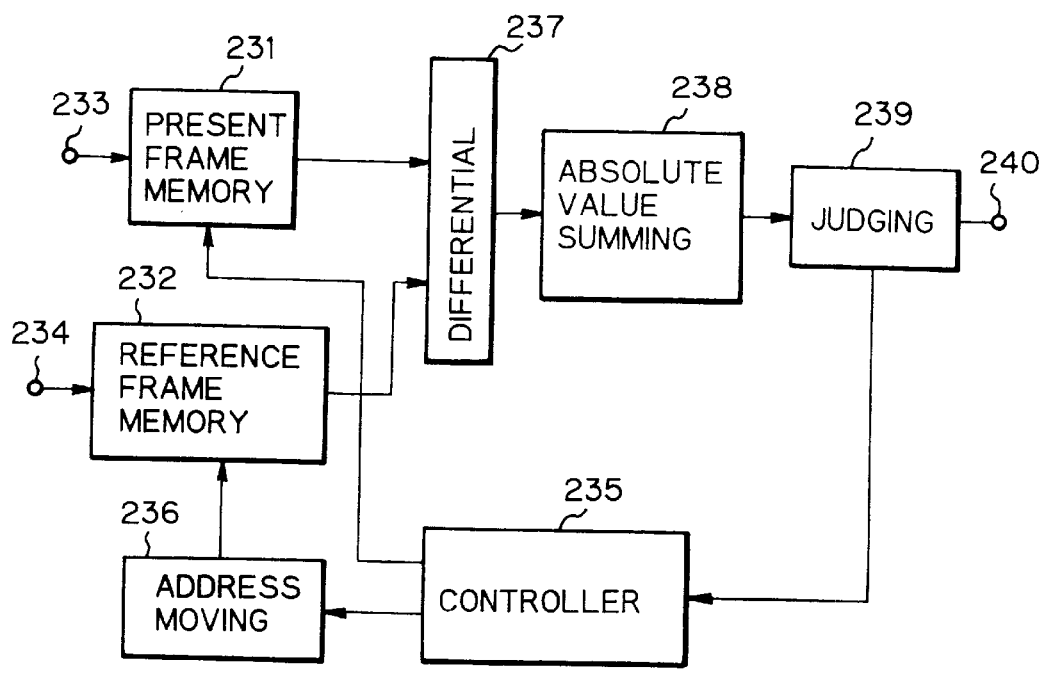
FIG. 3 is a block diagram a motion vector detecting apparatus using the conventional full search method.
Figure 4:
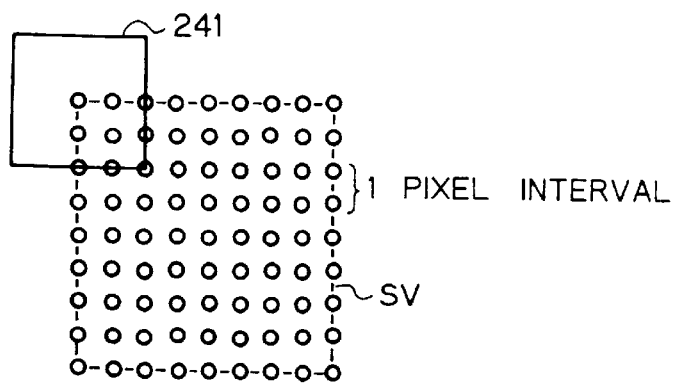
FIG. 4 is a schematic diagram to which reference is made in explaining the apparatus of FIG. 3.
Figure 5:
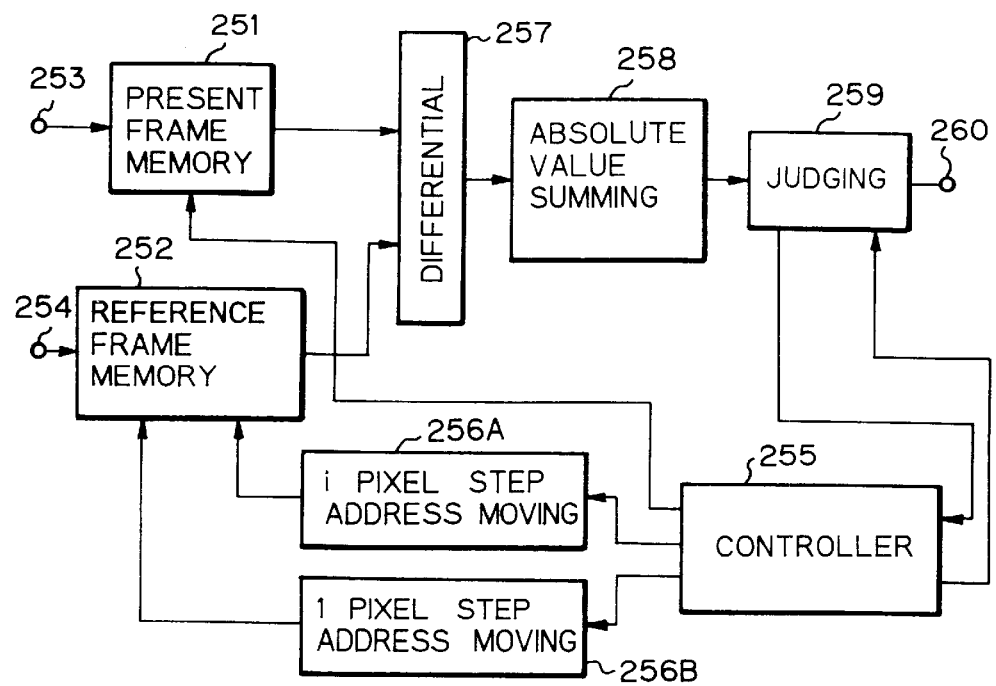
FIG. 5 is a block diagram of a motion vector detecting apparatus using the conventional multistep search.
Figure 6:
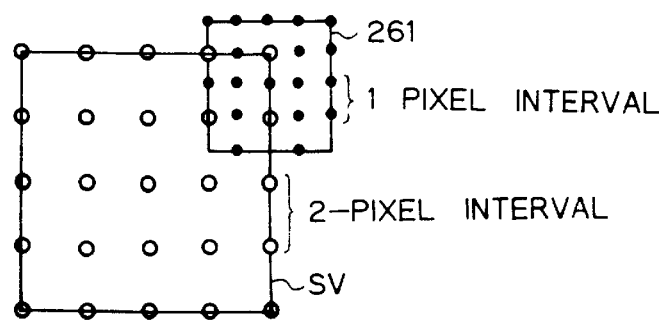
FIG. 6 is a schematic diagram to which reference is made in explaining the apparatus of FIG. 5.
Figure 7:
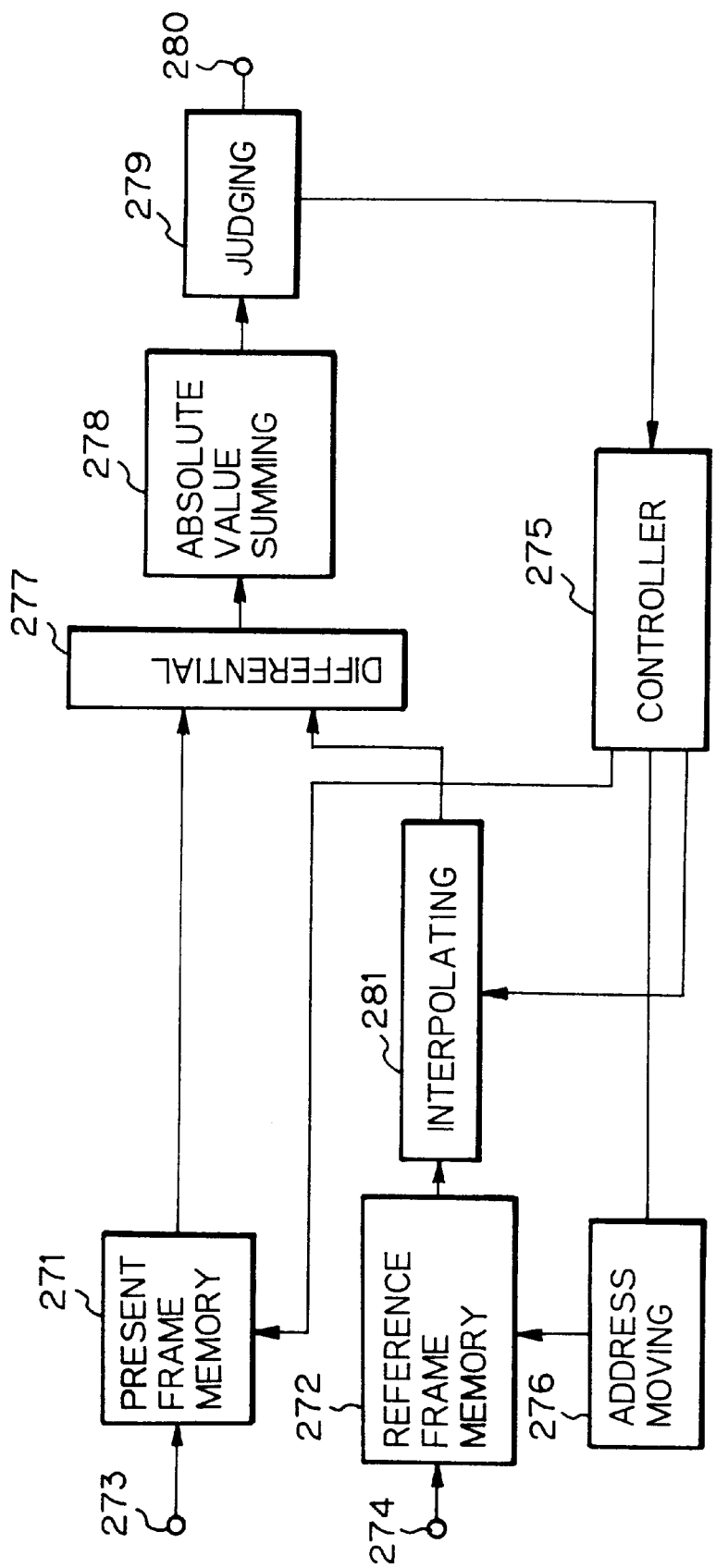
FIG. 7 is a block diagram of a motion vector detecting apparatus using the conventional interpolating method for detecting a motion vector at high precision.
Figures 8, 10:
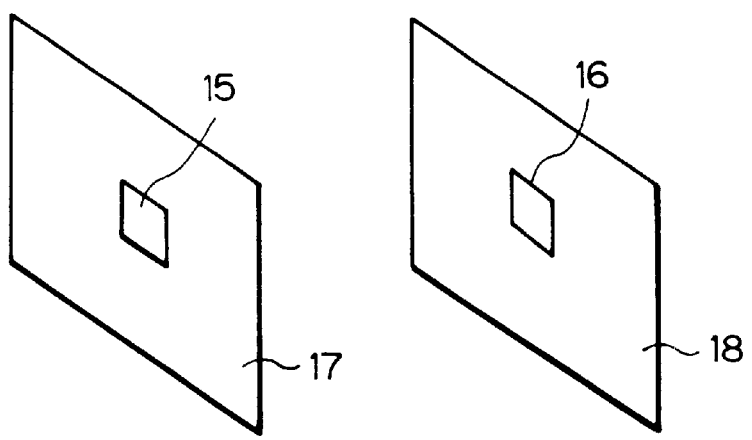
FIG. 8 is a schematic diagram illustrating interpolated pixels.
FIG. 10 is a schematic diagram showing the relationship between a reference frame, a present frame, a check block and a reference block, as used by the apparatus of FIG. 9.

FIG. 10 shows a present frame 17 having a reference block 15, and a reference frame 18 having a check block 16. The process of detecting a degree of matching between the reference block 15 and the check block 16 will now be explained.

Figure 11A:
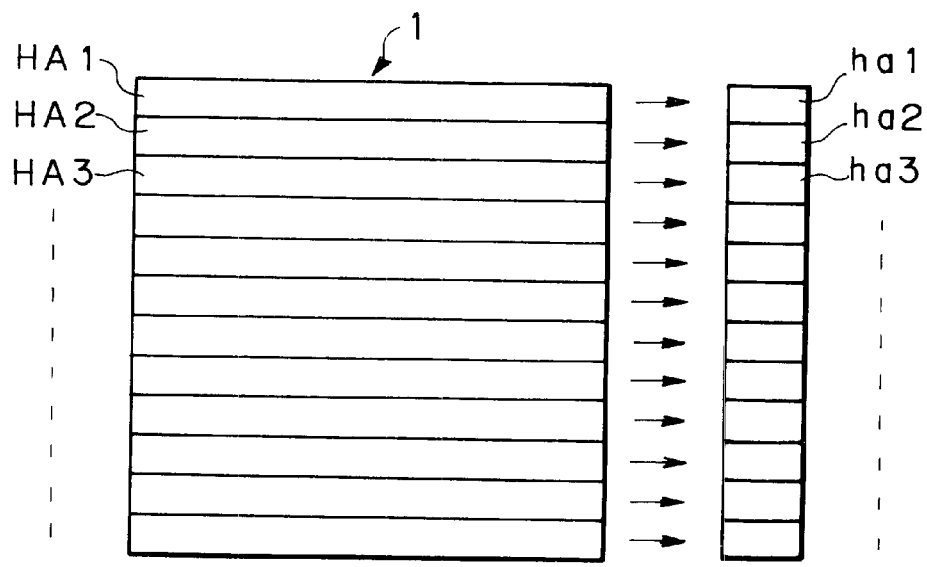
FIGS. 11A and 11B are schematic diagrams showing small blocks in the horizontal and vertical directions, respectively, of a reference block.
Figure 11B:
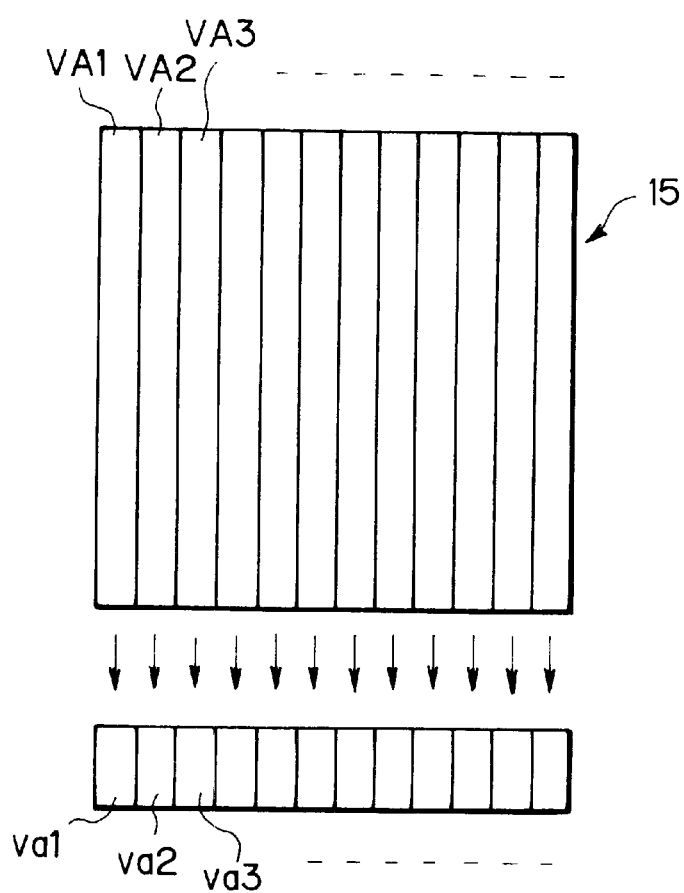

FIG. 11A shows the reference block 15 divided in the horizontal direction, thereby forming small blocks HA1, HA2, HA3, . . . Feature values ha1, ha2, ha3, . . . for the small blocks HA1, HA2, HA3, . . . are obtained. FIG. 11B shows the reference block 15 divided in the vertical direction, thereby forming small blocks VA1, VA2, VA3, . . . Feature values va1, va2, va3, . . . for the small blocks VA1, VA2, VA3, . . . of the reference block 15 are obtained. The divisions shown in FIGS. 11A and 11B are referred to as a two direction arrangement, with the directions being horizontal and vertical.

Figure 12A:
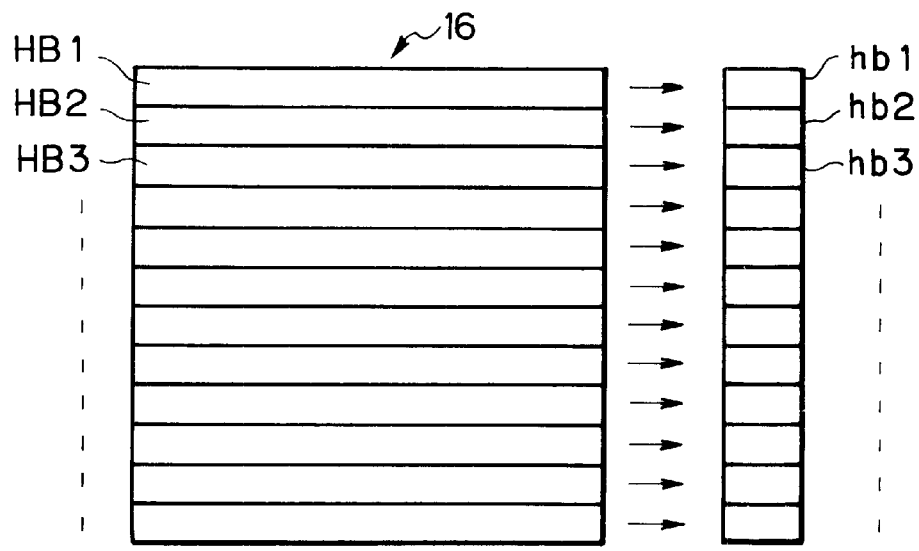
FIGS. 12A and 12B are schematic diagrams showing small blocks in the horizontal and vertical directions, respectively, of a check block.
Figure 12B:
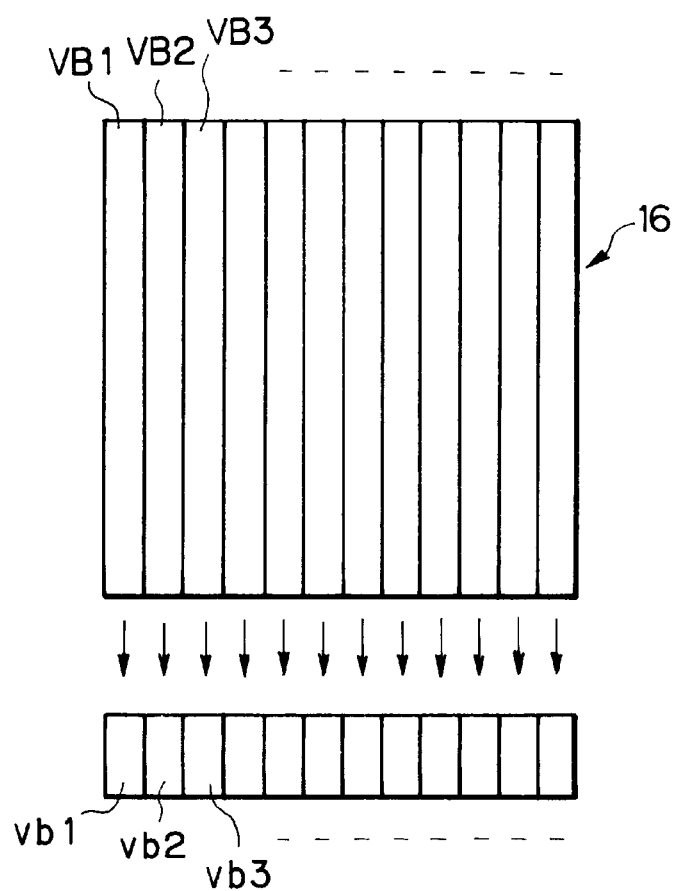

Similarly, FIGS. 12A and 12B show the check block 16 divided into the horizontal direction to form small blocks HB1, HB2, HB3, . . . for which feature values hb1, hb2, hb3, respectively, are obtained, and divided in the vertical direction to form small blocks VB1, VB2, VB3, . . . for which feature values vb1, vb2, vb3, . . . , respectively, are obtained.

Comparison circuit 10A of FIG. 9 compares the feature values ha1, ha2, ha3, . . . for the reference block 15 with the feature values hb1, hb2, hb3, . . . for the check block 16 to determine the degree of matching of the reference block 15 and the check block 16. Comparison circuit 10B of FIG. 9 compares the feature values va1, va2, va3, . . . for the reference block 15 with the feature values vb1, vb2, vb3, . . . for the check block 16 to determine the degree of matching of the reference block 15 and the check block 16.

The amount of computation required according to the present invention to compare the feature values representing the reference and check blocks is less than the amount of computation required according to the conventional full search method to compare the pixels of the reference and check blocks. Thus, the present invention reduces the computation needed to detect motion vectors.

When small blocks are formed from each of the reference and check blocks, as described above, the detection accuracy for motion vectors is substantially the same as the detection accuracy for motion vectors in the conventional full search method.

The case where feature extraction uses one-dimensional Hadamard conversion will now be explained.

The pixels of a small block may be Hadamard converted to obtain a series of Hadamard coefficients. Assuming that the elements of each of the one-dimensional series which were obtained by dividing into (n) series are set to $2^m$ (m=1, 2, 3, . . . ), $$A_i(2^m) = (A_{i1}, A_{i2}, \ldots A_{i2m})$$

In this instance, the Hadamard series of $2^m \times 2^m$ is as follows.

$$H(2^1, 2^1) = \begin{bmatrix} 1 & 1 \\ 1 & -1 \end{bmatrix} \quad \text{(eq. 4)}$$

$$H(2^m, 2^m) = \begin{bmatrix} H(2^{(m-1)}) & H(2^{(m-1)}) \\ H(2^{(m-1)}) & -H(2^{(m-1)}) \end{bmatrix}$$

When $A_i$ is Hadamard converted by using the above equation, the following equations are obtained:

$$a_i(2^m) = H(2^m, 2^m) \times A_i(2^m) \quad \text{(eq. 5A)}$$

$$a_i(2^m) = (a_{i1}, a_{i2}, \ldots a_{i2m}) \quad \text{(eq. 5B)}$$

By extracting one or a plurality of elements from among $a_{i1}$ to $a_{i2m}$, the feature extraction is executed.

When the elements of $A_i$ are not equal to $2^m$, the feature extraction can be similarly executed as follows. When it is now assumed that the number of elements is equal to (m'), a conversion series H (m', n) of (n×m') in which all of the elements are equal to 1 or −1 is formed. $A_i$ are converted by using the series:

$$a_i(m') = H(m', n) \times A_i(m') \quad \text{(eq. 6A)}$$

$$a_i(m') = (a_{i1}, a_{i2}, \ldots, a_{im'}) \quad \text{(eq. 6B)}$$

In this instance, the feature extraction is executed by extracting one or a plurality of elements from ail to $a_{im'}$.

Figure 13A:
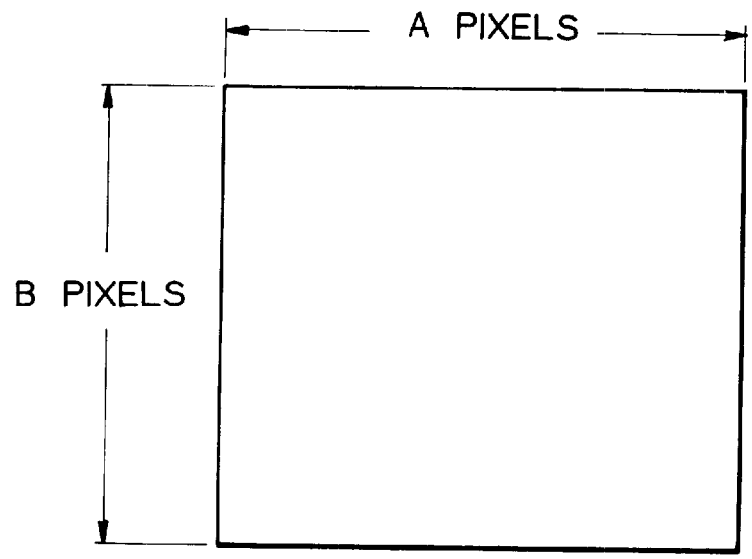
FIGS. 13A and 13B are schematic diagrams illustrating a block and its division into a grid of small blocks.
Figure 13B:
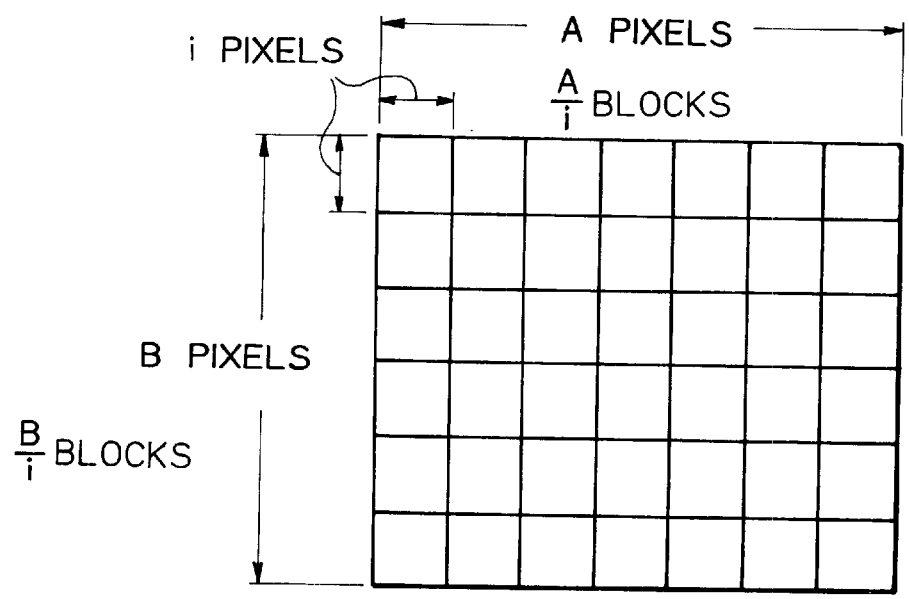

In the embodiment of the present invention described above, small blocks were formed in two directions for each of the reference and check blocks, namely, the horizontal direction and the vertical direction. Alternatively, it is possible to divide each of the reference and check blocks into a grid (i,e., a checkerboard or lattice) of small blocks. FIG. 13A shows an undivided block, that is, a reference block or check block. FIG. 13B shows the block of FIG. 13A divided into a grid of small blocks. For each of the reference and check blocks, a feature value is obtained for each of the small blocks in the grid. The feature values of corresponding small blocks of the reference and check blocks are compared. The amount of calculation required for the grid arrangement of small blocks is less than the amount of calculation required for the conventional full search method involving pixel by pixel comparisons. However, the amount of calculation required for the grid arrangement of small blocks is greater than the amount of calculation required when the small blocks are in two directions, as shown in FIGS. 11A, 11B and 12A, 12B.

For example, when a motion vector is detected by dividing a block comprising (A) pixels in the horizontal direction and (B) pixels in the vertical direction as shown in FIG. 13A into a grid of small blocks having (i) pixels in each dimension, the total number of small blocks formed is equal to $$(A/i) \times (B/i)$$

If the block shown in FIG. 13A is instead divided into small blocks in two directions, as shown in FIGS. 11A, 11B or 12A, 12B, the total number of small blocks formed is equal to $$(A/i) + (B/i)$$

Since fewer small blocks are formed in the two direction arrangement shown in FIGS. 11A, 11B or 12A, 12B, than are formed in the grid arrangement shown in FIG. 13B, the two direction arrangement requires less computation than the grid arrangement, while producing a motion vector having substantially the same accuracy.

Figure 14B:
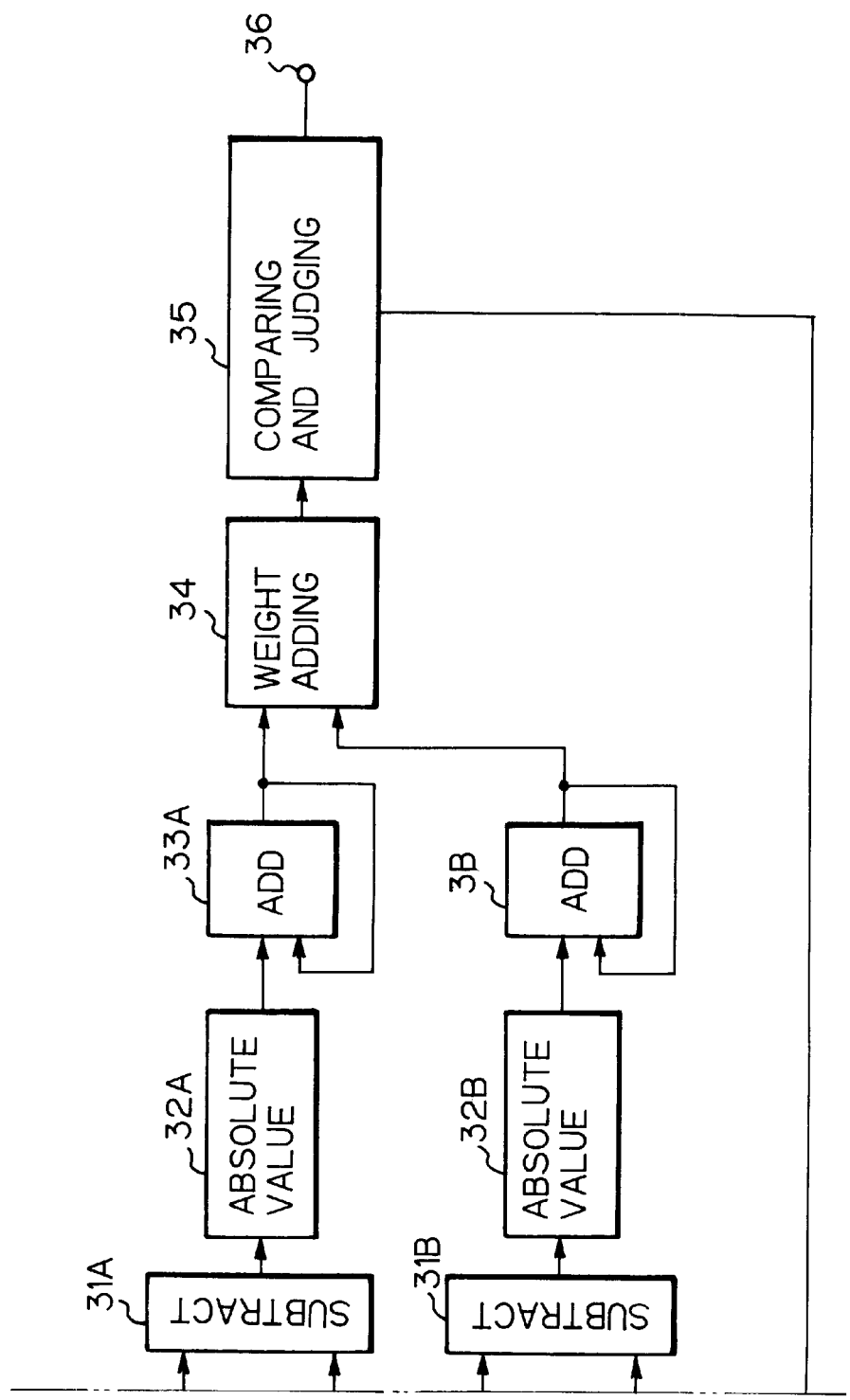
FIG. 14 is a block diagram of another motion vector detecting apparatus according to the present invention.

FIG. 14 shows another embodiment of a motion vector detecting apparatus according to the present invention, in which feature values for the small blocks of a check block are obtained by accumulating pixels.

Image data of a present frame is supplied to an input terminal 23 which supplies the image data to present frame memory 21 that functions to store the present frame. Image data of a reference frame is supplied to an input terminal 24 which supplies the image data to reference frame memory 22 that functions to store the reference frame. Controller 26 controls reading and writing of the present and reference frame memories 21, 22.

The present frame memory 21 also functions to output image data of the present frame as a reference block of (N×M) pixels, for example, (16×16) pixels, and to supply the reference block to a demultiplexer 27.

The reference frame memory 22 also functions to output image data of the reference frame as a check block of (N×M) pixels, and to supply the check block to a demultiplexer 29. An address moving circuit 25 is operative to vary the readout address applied to the reference frame memory 22 so as to move the position of the check block in a predetermined vector search range every pixel.

The demultiplexers 27, 29 are each adapted to divide the reference and check blocks respectively supplied thereto into a plurality of small blocks in two dimensions. The small blocks divided in the horizontal direction are supplied to feature extracting circuits 28A, 30A. The small blocks divided in the vertical direction are supplied to feature extracting circuits 28B, 30B.

Each of the feature extracting circuits 28A, 30A is operative to obtain one or more feature values for each of the small blocks supplied thereto, and to output the feature values to subtracting circuit 31A. Similarly, feature extracting circuits 28B, 30B are operative to obtain feature values and output the feature values to subtracting circuit 31B.

Specifically, feature circuits 28A, 28B and 30A, 30B respectively obtain the feature values $ha_n$, $va_n$, $hb_n$ and $vb_n$, n=1 to 16, from the pixels of the small blocks formed from the blocks A(n,n), B(n,n), n=1 to 16, as shown in FIGS. 15 and 16, according to the following equations:

$$ha_n = \sum_{i=1}^{16} A(n, i) \quad \text{(eq. 7A)}$$

$$va_n = \sum_{i=1}^{16} A(i, n) \quad \text{(eq. 7B)}$$

$$hb_n = \sum_{i=1}^{16} B(n, i) \quad \text{(eq. 7C)}$$

$$vb_n = \sum_{i=1}^{16} B(i, n) \quad \text{(eq. 7D)}$$

Figure 17:
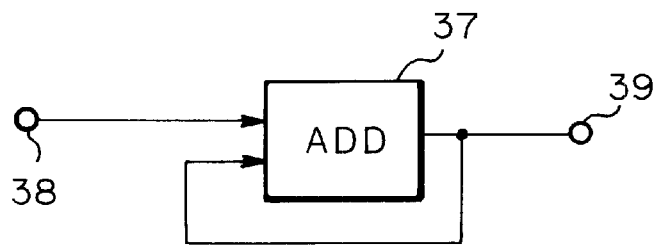
FIG. 17 is a block diagram of a feature extracting circuit for a reference block according to the present invention.

FIG. 17 shows a circuit construction suitable for the feature extracting circuits 28A, 28B. Pixels of a small blocks of the reference block are supplied to input terminal 38, which supplies the pixels to an input of adder 37. An output of adder 37 is applied to another input terminal of adder 37. Adder 37 functions to sum the pixels of the small blocks in one direction to obtain a feature value for the small block, and to supply the feature value to output terminal 39.

Figure 18:
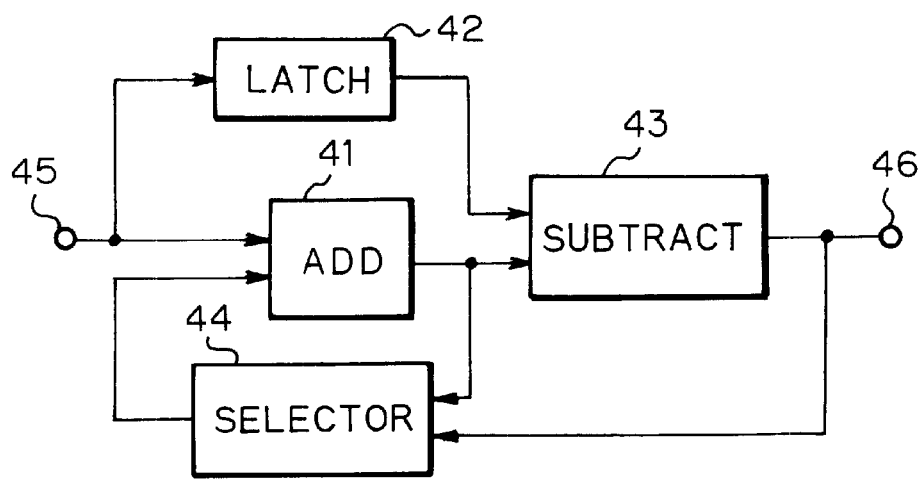
FIG. 18 is a block diagram of a feature extracting circuit for a check block according to the present invention.

FIG. 18 shows a circuit construction suitable for the feature extracting circuits 30A, 30B, which reduces the amount of computation as the check block is moved in the predetermined vector search range, and which comprises adding circuit 41, latch circuit 42, subtracting circuit 43, and selector 44.

Figure 19:
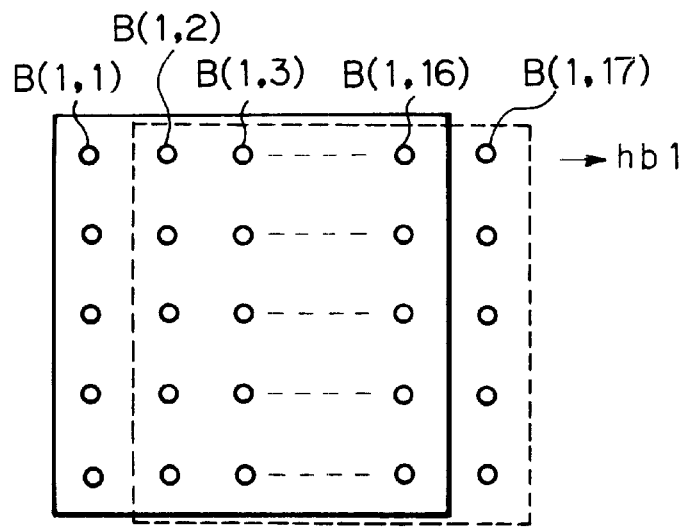
FIG. 19 is a schematic diagram illustrating movement of a check block.

FIG. 19 shows a current position of a small block as a solid line. The feature value $hb1^{current\ position}$ of this small block is:

$$hb1^{current\ position} = B(1,1) + B(1,2) + B(1,3) + \ldots + B(1,16) \quad \text{(eq. 8A)}$$

The next position of this small block, that is, a movement to the right by one pixel, is shown as a broken line. The feature value $hb1^{next\ position}$ of this small block is:

$$hb1^{next\ position} = B(1,2) + B(1,3) + B(1,4) + \ldots + B(1,17) \quad \text{(eq. 8B)}$$

From comparing equations 8A and 8B, it will be appreciated that they are related as follows:

$$hb1^{next\ position} = hb1^{current\ position} - B(1,1) + B(1,17) \quad \text{(eq. 8C)}$$

Calculating $hb1^{next\ position}$ according to equation 8B requires more computation than calculating $hb1^{next\ position}$ according to equation 8C. Therefore, the amount of computation as the check block is moved in the predetermined vector search range is reduced by constructing feature circuits 30A, 30B according to equation 8C.

Pixels of the small blocks of the check block are supplied to input terminal 45 of FIG. 18, which supplies the pixels to an input of adder 41 and to latch 42. An output of selector 44 is applied to another input terminal of adder 41. Adder 41 functions to add the newly supplied pixel to the output of selector 44, and to supply the result to subtractor 43 and to selector 44. Latch 42 functions to store a plurality of pixels and to supply one of the stored pixels as an output to subtractor 43. Subtractor 43 functions to subtract the pixel received from latch 42 from the result received from adder 41, and to apply the thus obtained value to output terminal 46 and to selector 44.

Initially, for the first position of the check block, selector 44 functions to select the output of the adder 41 and to supply the output of adder 41 as its own output. Latch 42 is storing pixels into its storage locations and producing an output of zero value at the first position of the check block. Therefore, adder 41 sums pixels of the small blocks in the horizontal or vertical direction of the first position of the check block. At the next position of the check block, when the pixel B(1,17) is received from input terminal 45, adder 41 produces the result $hb1^{current\ position} + B(1,17)$. Latch 42 supplies its oldest value, for example, B(1,1) to subtractor 43 which uses the latched value to produce an output, $hb1^{current\ position} + B(1,17) - B(1,1)$. Selector 44 now functions to select the output of subtractor 43, so that the feature values for the repositioned check block can be obtained with fewer computations.

Subtracting circuit 31A of FIG. 14 functions to subtract the feature values of the small blocks in the horizontal direction of the check block from the feature values of the small blocks in the horizontal direction of the reference block, $ha_n - hb_n$, n=1 to 16, and to supply the result to absolute value circuit 32A. Similarly, subtracting circuit 31B functions to subtract the feature values of the small blocks in the vertical direction of the check block from the feature values of the small blocks in the vertical direction of the reference block, $va_n - vb_n$, n=1 to 16, and to supply the result to absolute value circuit 32B.

The absolute value circuits 32A, 32B are operative to obtain the absolute values of the subtraction results supplied thereto, $|ha_n - hb_n|$, $|va_n - vb_n|$, n=1 to 16, respectively, and to supply the absolute values to summing circuits 33A, 33B, respectively.

The summing circuits 33A, 33B are adapted to sum the absolute values of the differences supplied thereto, $\Sigma|ha_n - hb_n|$, $\Sigma|va_n - vb_n|$, n=1 to 16, respectively, and to supply the sums of the horizontal and vertical differences to weight adding circuit 34.

The weight adding circuit 34 is operative to weight the sums of the differences, to add them together to produce a result, $(Wh \cdot \Sigma|ha_n - hb_n|) + (Wv \cdot \Sigma|va_n - vb_n|)$, and to supply the result to comparing and judging circuit 35.

The comparing and judging circuit 35 functions to select the check block having a position in the predetermined vector search range which minimizes the result received from the weight adding circuit 34 as a matching block, to determine a motion vector between the reference block and the matching block, and to supply the motion vector to output terminal 36.

Figure 20:
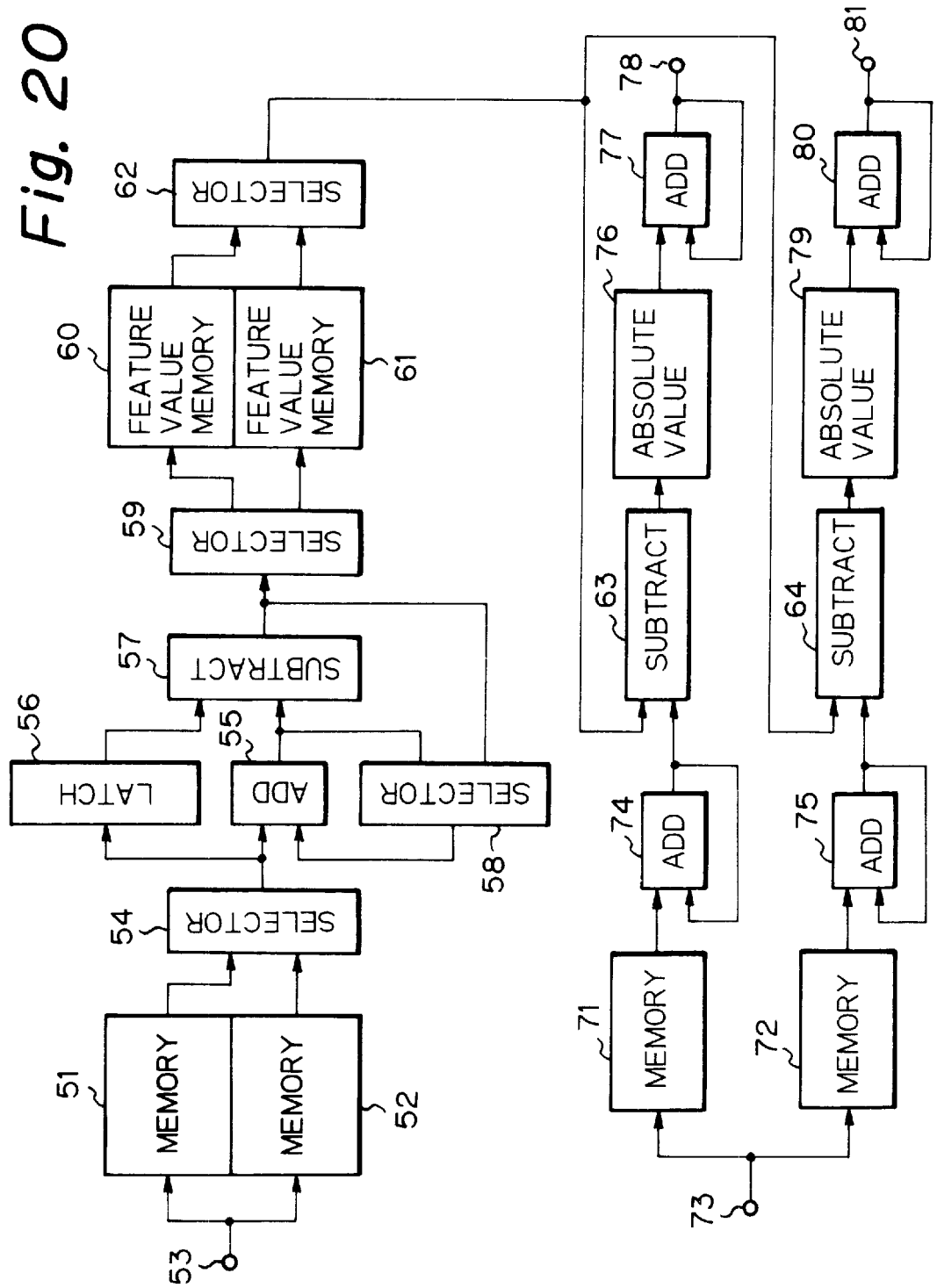
FIG. 20 is a block diagram of another motion vector detecting apparatus according to the present invention.

FIG. 20 shows another embodiment of a motion vector detecting apparatus according to the present invention, in which feature values which were obtained during detection of a previous motion vector are reused during detection of a present motion vector. The apparatus in FIG. 20 shows a simplified hardware arrangement.

The motivation for the embodiment shown in FIG. 20 will now be explained with reference to FIG. 21, which shows vector search ranges A1, B1, A2, B2, A3, B3 and reference blocks C1, D1, C2, D2, C3, D3.

Figure 21:
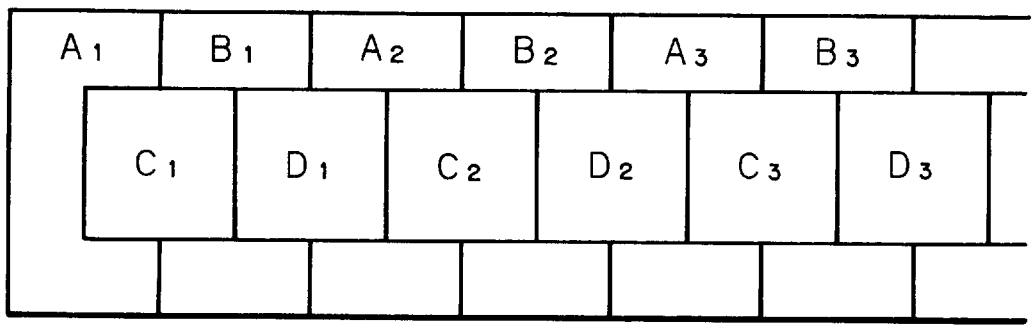
FIG. 21 is a diagram illustrating the predetermined vector search ranges for a series of reference blocks.

For the reference block C1 shown in FIG. 21, the predetermined vector search range comprises the ranges A1, B1. When a motion vector is detected for the reference block C1, feature values of the small blocks in the reference block C1 are needed and feature values of the small blocks in the vector search ranges, A1 and B1 are needed.

For the next reference block D1 shown in FIG. 21, the predetermined vector search range comprises the ranges B1, A2. When a motion vector is detected for the reference block D1, feature values of the small blocks in the reference block D1 are needed and feature values of the small blocks in the vector search ranges B1 and A2 are needed. Since the feature values of the small blocks in the vector search range. B1 were obtained previously during detection of the motion vector for the reference block C1, it is efficient to reuse these feature values when detecting the motion vector for the reference block D1.

Similarly, during detection of the motion vector for the reference block C2, it is efficient to reuse the feature values for the vector search range A2, which were obtained previously during detection of the motion vector for the reference block D1.

In general, half of the feature values for the present vector search range may be reused from the previous vector search range.

The embodiment of FIG. 20 will be explained with respect to only the horizontal direction. One of ordinary skill in the art will readily appreciate operation in the vertical direction.

Image data (pixels) of a reference frame are supplied to an input terminal 53 that supplies the reference frame pixels to search area memories 51, 52, each of which is adapted to store half of the predetermined vector search range, and to respectively supply the data stored therein as small blocks in the horizontal direction to a selector 54. Selector 54 is adapted to select the small blocks from one of the vector search ranges supplied thereto, and to apply the selected small blocks to an adding circuit 55 and a latch circuit 56.

Adder 55, latch 56, subtractor 57 and selector 58 shown in FIG. 20 function in generally the same manner as the corresponding elements of FIG. 18 to obtain feature values for the small blocks in the horizontal direction of the halves of the predetermined search range.

Selector 59 is adapted to supply the feature value from subtractor 57 to feature value memories 60, 61, each of which is adapted to store the feature values for half of the predetermined vector search range, and to supply the values stored therein to selector 62. Selector 62 is operative to supply the feature values applied thereto to subtracting circuits 63, 64.

Image data (pixels) of the present frame are supplied to an input terminal 73 that supplies reference block data from the present frame to reference block memories 71, 72, each of which is adapted to store the reference block and to supply the stored reference block to adding circuits 74, 75, respectively.

Adder 74 also receives its own output, and functions to accumulate the pixels of small blocks in the horizontal direction of the reference block, thereby obtaining feature values for the small blocks in the horizontal direction of the reference block stored in the reference block memory 71. Adder 74 supplies the feature values to the subtractor 63.

Subtractor 63 is operative to subtract the feature values of the small blocks of the check block from the feature values of the small blocks of the reference block, and to supply the resulting difference to absolute value circuit 76 which is adapted to produce the absolute value of the difference between the feature values, and to supply the absolute value of the difference to adder 77.

Adder 77 also receives its own output, and functions to sum the absolute value of the differences between the feature values of the small blocks in the horizontal direction of the reference and check blocks, and to apply the sum to output terminal 78.

Adder 75, subtractor 64, absolute value circuit 79 and adder 80 function in the same manner as adder 74, subtractor 63, absolute value circuit 76 and adder 77, respectively. Adder 77 applies its sum to output terminal 81.

As will be appreciated from the explanation below, subtractor 63, absolute value circuit 76, and adder 77 compare the feature values of a first reference block with the feature values in a particular search range, while subtractor 64, absolute value circuit 79, and adder 80 compare the feature values of a second reference block with the feature values in the same particular search range. Thus, the feature values for a particular search range are computed only once, and used to detect motion vectors for two separate reference blocks.

Figures 22A, 22B:
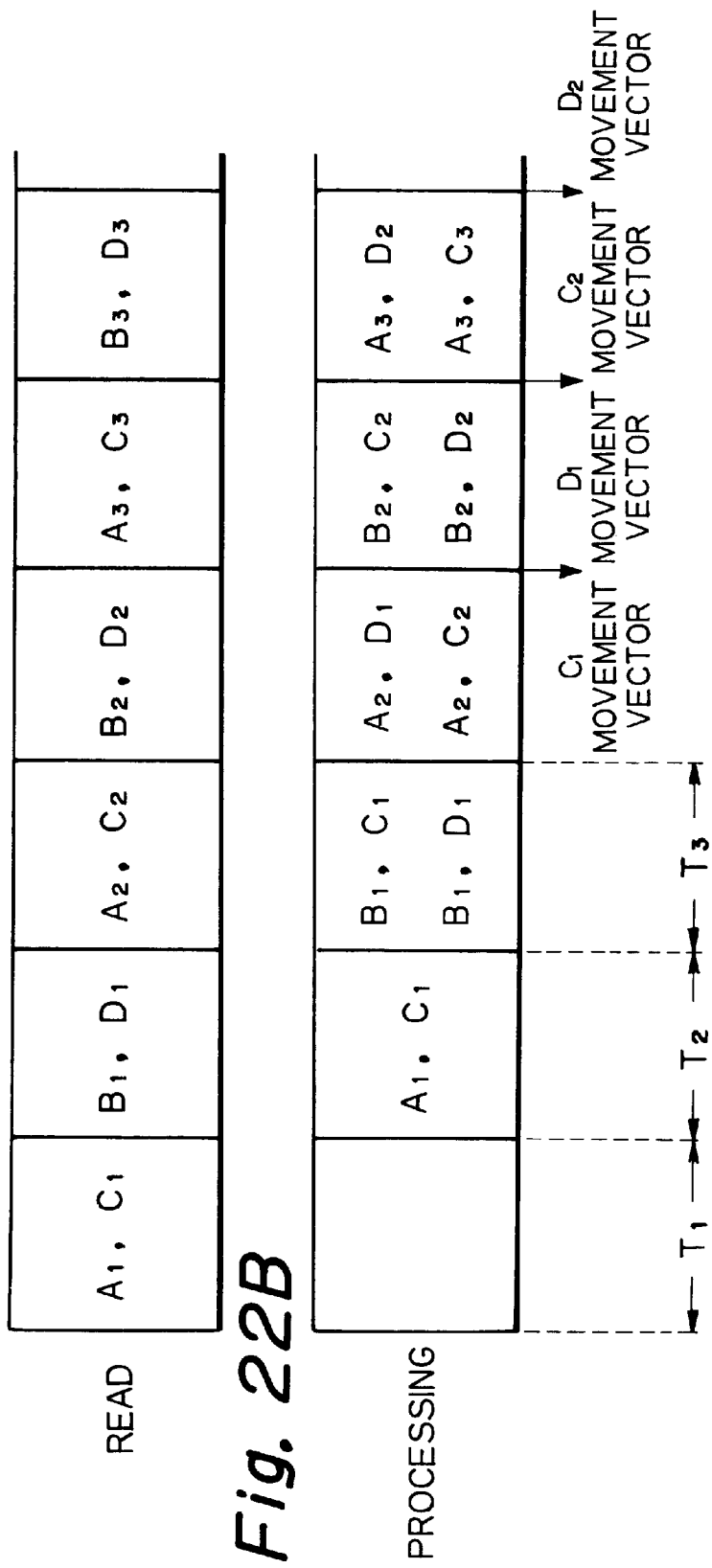
FIGS. 22A and 22B are schematic diagrams to which reference is made in explaining the operation of the apparatus of FIG. 20.

The operation of the embodiment of FIG. 20 will be explained with reference to FIGS. 22A and 22B. FIG. 22A shows occupancy of the memories 51, 52, 71, 72, and FIG. 22B shows the blocks for which feature values are being compared.

During time T1, as shown in FIG. 22A, data in the search range A1 are read into the search area memory 51 and data of the reference block C1 are read into the reference block memory 71, and the adder 55 obtains the feature values in the vector search range A1, which are stored in the feature value memory 60. The adder 74 obtains the feature values, from the data of the reference block C1 stored in the reference block memory 71.

During time T2, as shown in FIG. 22B, the subtractor 63, absolute value circuit 76, and adder 77 compare the feature values of the reference block C1 with the feature values in the search range A1. Also during time T2, as shown in FIG. 22A, data in the vector search range B1 are read into the search area memory 52 and data in the next reference block D1 are read into the reference block memory 72, and the adder 55 obtains the feature values in the vector search range B1, which are stored in the feature value memory 61. The adder 75 obtains the feature values from the data of the reference block D1 stored in the reference block memory 73.

During time T3, as shown in FIG. 22B, the subtractor 63, absolute value circuit 76, and adder 77 compare the feature values of the reference block C1 with the feature values in the search range B1. Thus, the reference block C1 is compared with the search range comprising A1, B1, as also shown in FIG. 21, and motion vectors in the search ranges A1 and B1 for the reference block C1 are obtained. At the end of time T3, the motion vector for the reference block C1 is output.

Also during time T3, as shown in FIG. 22B, the subtractor 64, absolute value circuit 79, and adder 80 compare the feature values of the reference block D1 with the feature values in the search range B1. Additionally during time T3, as shown in FIG. 22A, data in the vector search range A2 are read into the search area memory 51 and data in the next reference block C2 are read into the reference block memory 71, and the adder 55 and subtractor 57 obtain the feature values in the vector search range A2, which are stored in the feature value memory 60. The adder 74 obtains the feature values from the data of the reference block C2 stored in the reference block memory, 71.

In a manner similar to the above, the motion vectors for the reference blocks D1, C2, D2, C3, D3, . . . are obtained.

Figure 23A:
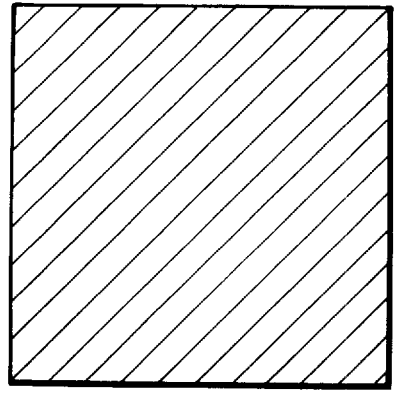
FIGS. 23A and 23B are block diagrams illustrating small division of a block into small blocks in two oblique directions.
Figure 23B:
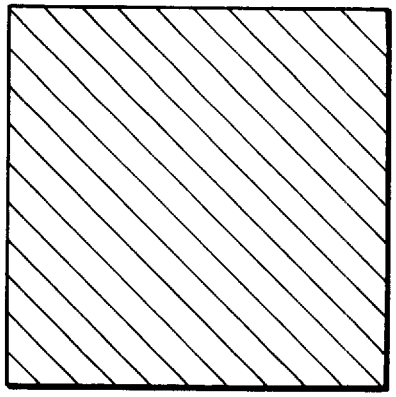

The two directions for forming small blocks may be the horizontal direction and the vertical direction, as described above. Alternatively, the two directions for forming small blocks may be two other substantially perpendicular directions, such as the forward oblique direction shown in FIG. 23A and the reverse oblique direction shown in FIG. 23B. The oblique directions of FIGS. 23A and 23B are at angles of 45° and 135°, respectively, with respect to the horizontal axis.

When the two directions for dividing a block are the horizontal and vertical directions, horizontal and vertical lines in the image can be readily distinguished from the feature values for the small blocks, but it is sometimes impossible to distinguish diagonal lines which are perpendicular to each other from the feature values. Similarly, when the two directions for dividing a block are the oblique directions shown in FIGS. 23A, 23B, diagonal lines can be readily distinguished from the feature values for the small blocks, but it is sometimes difficult to distinguish horizontal and vertical lines from the feature values. Consequently, it will be appreciated that dividing a block in more than two directions, such as the horizontal direction, vertical direction, forward oblique direction and reverse oblique direction, increases the accuracy of motion detection.

Application of the present invention to the multistep method for producing motion vectors will now be discussed. For the multistep method, feature values are generated so that the accuracy which is necessary in a search interval at each step can be obtained.

Figure 24:
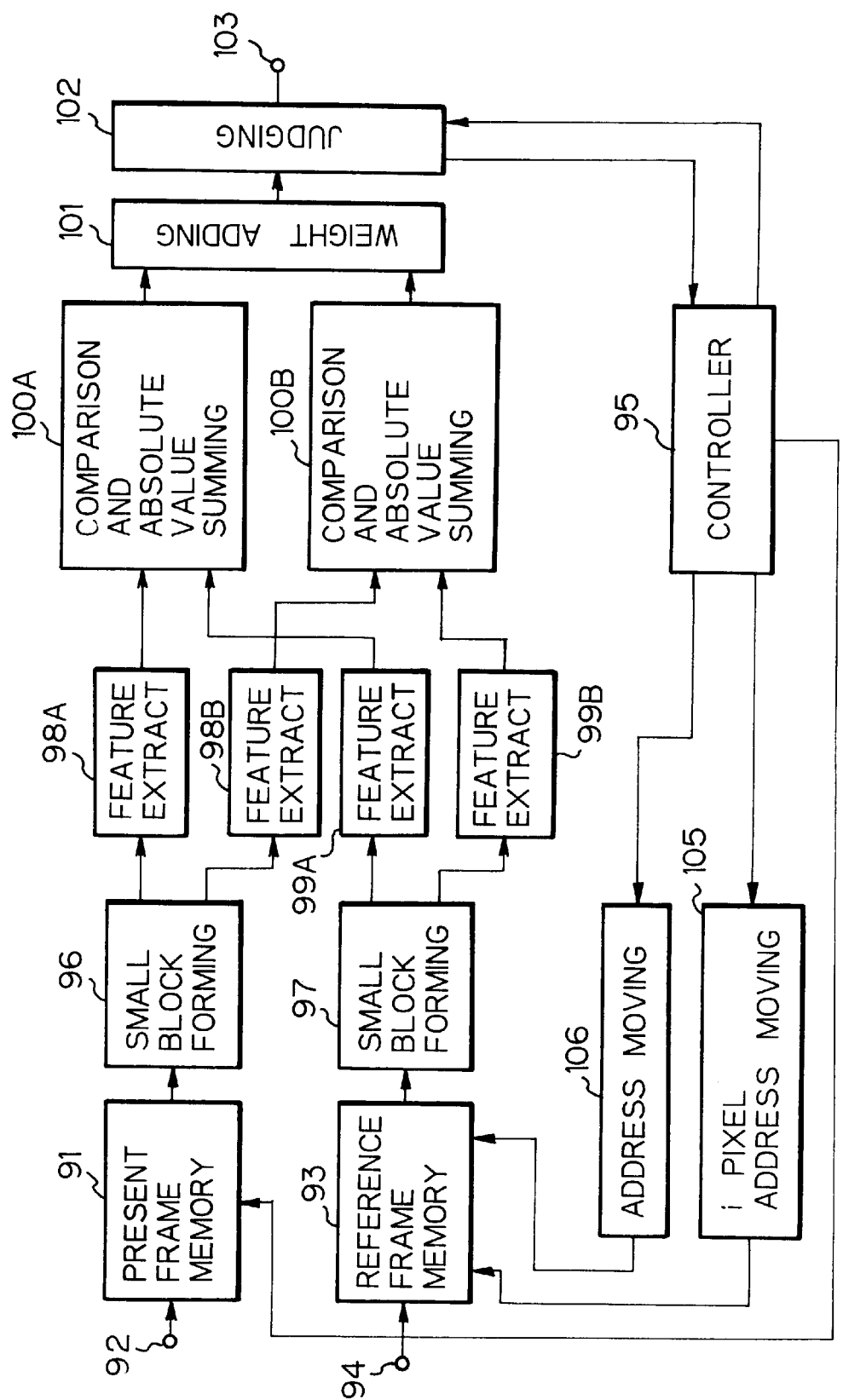
FIG. 24 is a block diagram of another motion vector detecting apparatus according to the present invention.

FIG. 24 shows another embodiment of a motion vector detecting apparatus according to the present invention, which uses a multistep method for obtaining motion vectors as modified by the present invention.

The multistep method for obtaining motion vectors according to the present invention will now be described with reference to FIGS. 25–28.

Figure 25A:
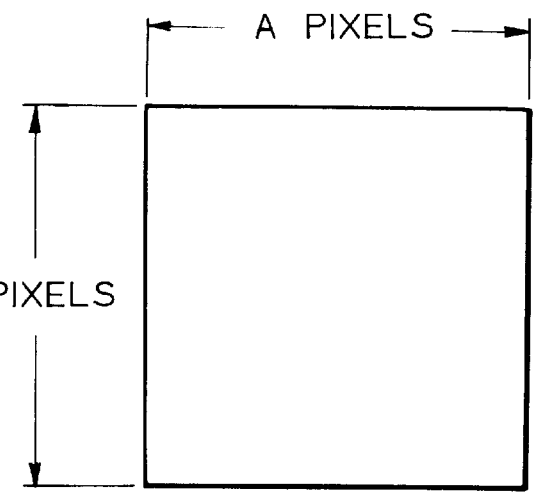
FIGS. 25A to 25C are diagrams illustrating division of a block into small blocks in the horizontal direction, and division of the small blocks into smaller blocks according to a multistep method of the present invention.
Figure 26A:
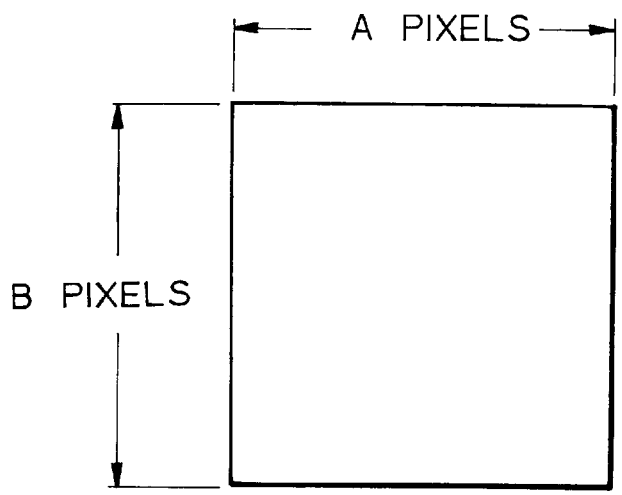
FIGS. 26A to 26C are diagrams illustrating division of a block into small blocks in the vertical direction, and division of the small blocks into smaller blocks according to a multistep method of the present invention.

FIGS. 25A and 26A show a block, which may be a reference block or a check block, comprising (A×B) pixels.

Figure 25B:
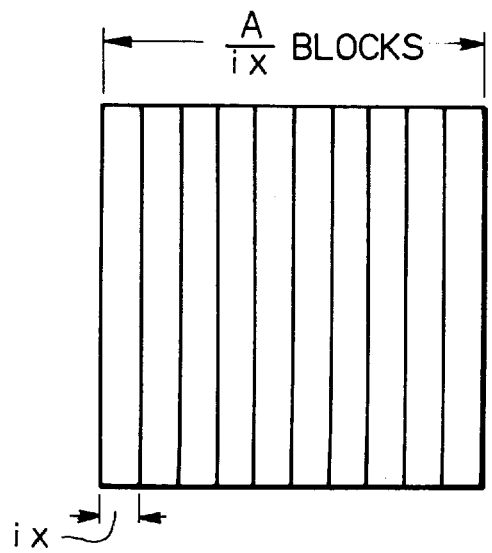
Figure 26B:
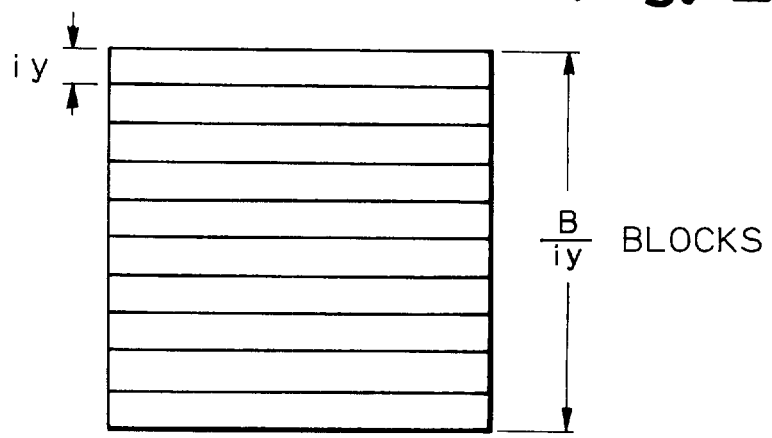

The first step of the multistep method according to the present invention comprises dividing the block into small blocks in the horizontal and vertical directions, also referred to as horizontal and vertical dimensions. FIG. 25B shows the block of FIG. 25A divided in the horizontal direction into (A/(ix)) small blocks each of dimension (ix)×(B) pixels. FIG. 26B shows the block of FIG. 26A divided in the vertical direction into (B/(iy)) small blocks each of dimension (A)×(iy) pixels. The (A/ix+B/iy) matching elements are extracted through a space filter from the small blocks obtained by dividing in correspondence to the search interval ix. Thus, the accuracy which is needed in the search interval which is required in the step can be obtained.

Figure 25C:
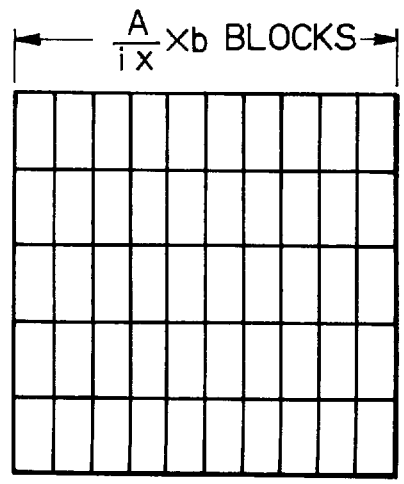
Figure 26C:
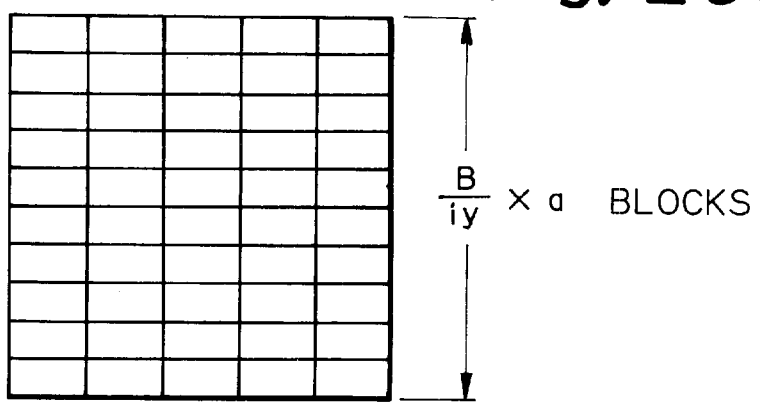

The next step of the multistep method according to the present invention comprises further dividing the small blocks formed during the previous step into smaller blocks. FIG. 25C shows each of the small blocks of FIG. 25B divided in the horizontal direction into (b) smaller blocks, 1≦b>B/iy, producing a total of (A/(ix))×(b) smaller blocks, each smaller block of dimension (A/(ix))×(B/b) pixels. FIG. 26C shows each of the small blocks of FIG. 26B divided in the vertical direction into (a) smaller blocks, 1≦a>A/ix, producing a total of (B/(iy))×(a) smaller blocks, each smaller block of dimension (B/(iy))×(A/a) pixels. In this next step, feature values are obtained for each of the smaller blocks shown in FIGS. 25C and 26C, thereby raising the detection accuracy for the motion vector.

When the number of divisions in a dimension is set to (K) and (K) is a value in a range which satisfies the following equation, the hardware scale of an apparatus according to the present invention can be reduced relative to the hardware scale for the conventional multistep method of detecting motion vectors.

$$K=((A/ix)\times b)+((B/ix)\times a))<A\times B/ix\cdot iy \quad \text{(eq. 9)}$$

FIGS. 27 and 28 show an example of operation of the multistep method for detecting motion vectors according to the present invention.

Figure 27A:
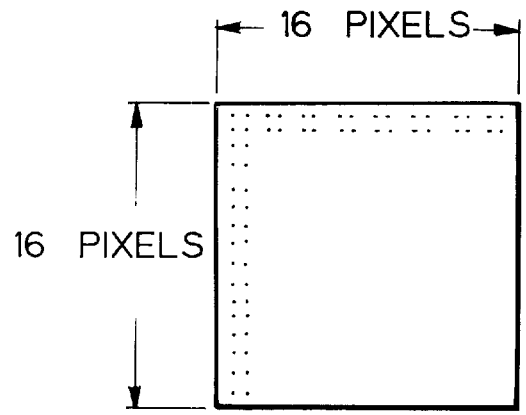
FIGS. 27A to 27C show the first step of a multistep method for obtaining motion vectors according to the present invention.
Figure 28A:
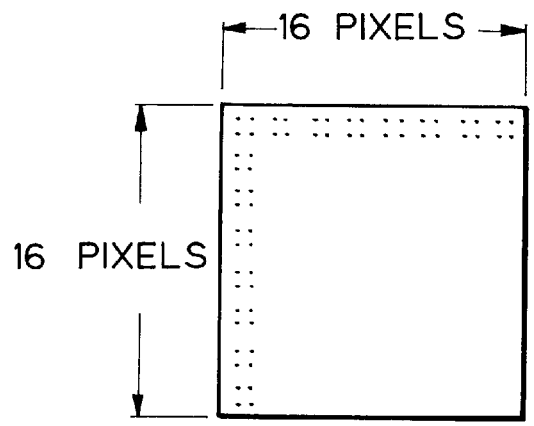
FIGS. 28A to 28C show the second step of a multistep method for obtaining motion vectors according to the present invention.

As shown in FIGS. 27A and 28A, the sizes of the reference block and check block are set to (16×16) pixels and a vector search range is set to ((+15) pixels x (−16) pixels).

Figure 27B:
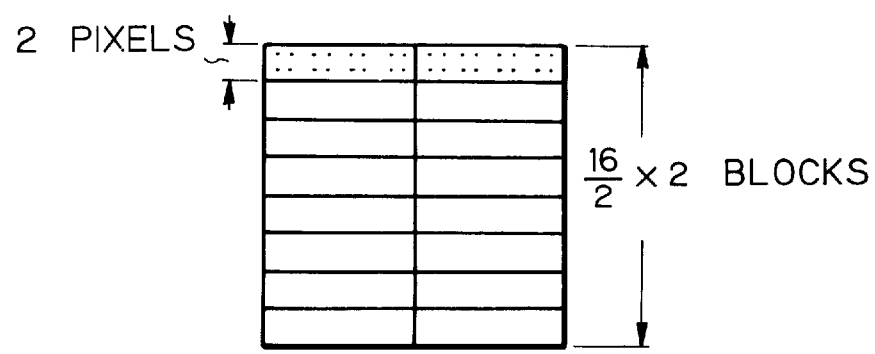
Figure 27C:
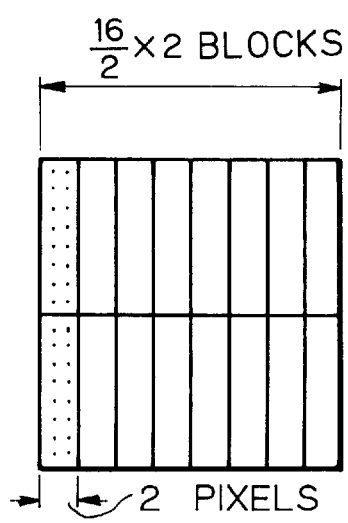

In the first step, the search interval ix is set to two pixels. As shown in FIGS. 27B and 27C, the (16×16) block is divided into small blocks every two pixels in the vertical direction and is also divided into small blocks every two pixels in the horizontal direction. Thus, the block is divided into 16/2 small blocks in the horizontal direction and is also divided into 16/2small blocks in the vertical direction. To increase the detection accuracy, each of the eight small blocks in the horizontal and vertical directions is divided into two smaller blocks. Thus, a total of 16/2×2 smaller blocks are formed in each direction, i,e., a total of 2×(16/2×2)=32 smaller blocks are formed. One feature value is obtained for each smaller block. By using the 32 feature values thus obtained, a motion vector is produced at an accuracy of two pixels.

Figure 28B:
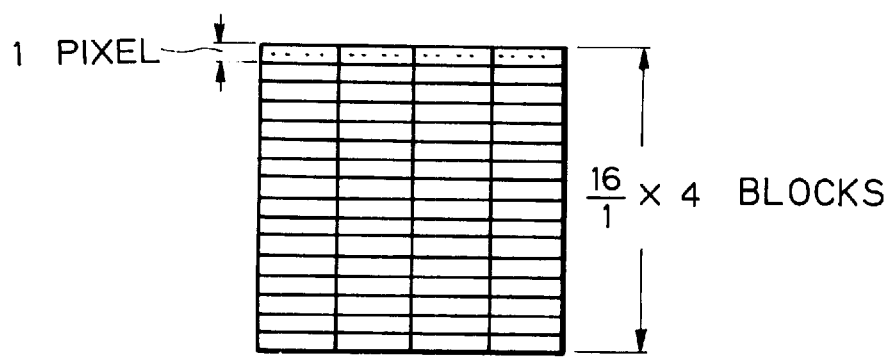
Figure 28C:
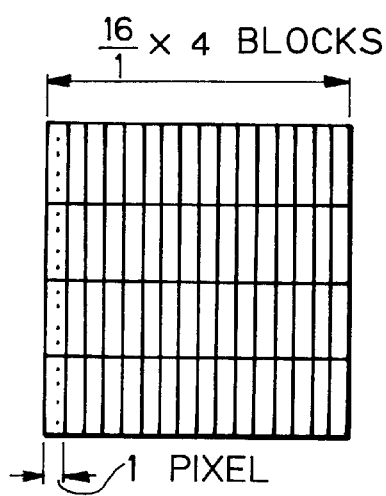

In the second step, the search interval ix is set to one pixel. As shown in FIGS. 28B and 28C, the (16×16) block is divided into small blocks every pixel in the vertical direction and is also divided into small blocks every pixel in the horizontal direction. Thus, the block is divided into 16/1 small blocks in the horizontal direction and is also divided into 16/1 small blocks in the vertical direction. To increase the detection accuracy, each of the sixteen small blocks in the horizontal and vertical directions is divided into four smaller blocks. Thus, a total of 16/1×4 smaller blocks are formed in each direction, i,e., a total of 2×(16/1×4)=128 smaller blocks are formed. One feature value is obtained for each smaller block. By using the 128 feature values thus obtained, a motion vector is produced at an accuracy of one pixel.

When the reference block and the check block are divided into a grid of small blocks and a feature value is obtained for each of the thus formed small blocks as shown in FIG. 13B, and a multistep search is performed, a method for feature value extraction is set so that the accuracy which is necessary in the search interval that is required in the step in accordance with the search interval can be held. With this method, the necessary accuracy is assured and a calculation amount does not increase.

Returning to FIG. 24, image data (pixels) of the present frame are applied to input terminal 92, which applies the pixels to a present frame memory 91 that is operative to store the image data of the present frame. Pixels of the reference frame are applied to input terminal 94, which applies the pixels to a reference frame memory 93 that is operative to store the image data of the reference frame. Controller 95 controls reading and writing of the present and reference frame memories 91, 93.

The present frame memory 91 also functions to output image data of the present frame as a reference block of (N×M) pixels and to supply the reference block to a small block forming circuit 96.

The reference frame memory 93 also functions to output image data of the reference frame as a check block of (N×M) pixels, and to supply the check block to a small block forming circuit 97. An address moving circuit 105 is operative to vary the readout address applied to the reference frame memory 93 so as to move the position of the check block in a predetermined vector search range every (i) pixels, that is, at a precision of (i) pixels. An address moving circuit 106 is operative to vary the readout address applied to the reference frame memory 93 so as to move the position of the check block in a predetermined vector search range every pixel, that is, at a precision of one pixel.

Small block forming circuits 96, 97, feature extracting circuits 98A, 98B, 99A, 99B, comparison and absolute value summing circuits 100A, 100B, and weight adding circuit 101 shown in FIG. 24 function in generally the same manner as the corresponding elements of FIG. 9. Weight adding circuit 101 of FIG. 24 applies its output to judging circuit 102.

During the first step of the multistep method according to the present invention, the check block is moved in the predetermined vector search range every (i) pixels by address moving circuit 105. At each repositioning of the check block, the judging circuit 102 functions to compare the evaluation values for the positions of the check block within the predetermined search range. The judging circuit 102 determines the position of the check block corresponding to the minimum of the evaluation values, generates a coarse motion vector between the reference block and the position of the check block corresponding to minimum of the evaluation values, and supplies the coarse motion vector to controller 95.

During the next step of the multistep method according to the present invention, the check block is moved in the vicinity of the range centered on the area indicated by the coarse motion vector on a pixel by pixel basis by address moving circuit 106. At each repositioning of the check block, the judging circuit 102 functions to compare the evaluation values for the positions of the check block within the predetermined search range. The judging circuit 102 determines the position of the check block corresponding to the minimum of the evaluation values, generates a fine motion vector between the reference block and the position of the check block corresponding to minimum of the evaluation values, and supplies the fine motion vector, having a precision of one pixel, to output terminal 103.

FIG. 24 depicts an apparatus which performs a two-step search. One of ordinary skill in the art will readily appreciate how to make an apparatus which performs a three-step search or a four-step search.

In the first step, the size of block of (N×M) is enlarged two times, thereby forming a block of (2N×2M). By subsampling such a block, a block of (N×M) is obtained. A, block matching is executed by moving the subsampled block every two pixels, thereby obtaining a coarse motion vector. In the next step, it is also possible to execute the block matching by moving the motion vector of (N×M) every pixel and to finally detect the motion vector at a high precision.

A variation according to the present invention for detecting a motion vector using a multistep method is to first detect a coarse motion vector using feature values of small blocks, and then to detect a motion vector at high precision using a pixel by pixel comparison of the reference and check blocks. This variation requires less calculation than the conventional multistep method and produces a motion vector at high precision.

Application of the present invention to the interpolating method for producing high precision motion vectors will now be discussed.

Figure 29B:
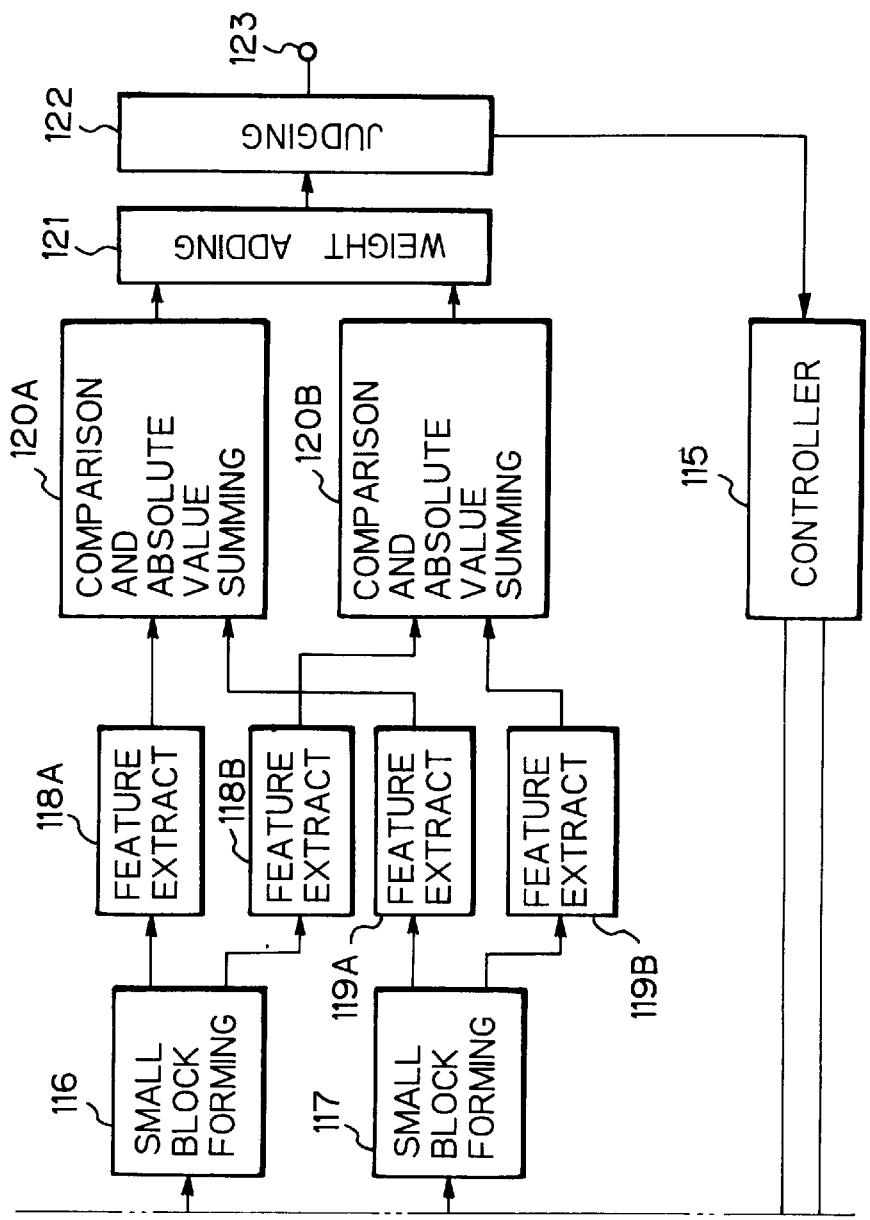
FIG. 29 is a block diagram of another motion vector detecting apparatus according to the present invention.

FIG. 29 shows another embodiment of a motion vector detecting apparatus according to the present invention which uses an interpolating method for obtaining motion vectors at a precision of ½ pixel. The apparatus of FIG. 29 interpolates the pixels of the reference frame, and moves the check block at every pixel within the predetermined search range of the interpolated reference frame to obtain a motion vector at a precision of one pixel at the interpolated reference frame resolution, which corresponds to a precision of ½ pixel at the original reference frame resolution.

Input terminals 112, 114, present frame memory 111, controller 115, small block forming circuits 116, 117, feature extracting circuits 118A, 118B, 119A, 119B, comparison and absolute value summing circuits 120A, 120B, weight adding circuit 121, and judging circuit 122 of FIG. 29 function in generally the same manner as the corresponding elements of FIG. 9.

Reference frame memory 113 functions to store the pixels of the reference frame received from input terminal 114, and to supply the data stored therein to switching circuit 126 in response to address data received from address moving circuit 124.

Switch 126 is adapted to supply the reference frame data to an interpolating circuit 125 or a switching circuit 127, in response to a control signal (not shown).

Interpolator 125 is operative to interpolate the reference block data to form interpolated data, and to supply the interpolated data to switch 127. As explained above with reference to FIG. 8, interpolated data is formed from two original pixels when its position is directly therebetween, and is formed from four original pixels when it is in the center of a quincunx pattern that it forms with the four original pixels.

Switch 127 is operative to select either the interpolated data or the original pixel data applied thereto as check block data. Address moving circuit 124, memory 113, interpolator 125 and switches 126, 126 function to move the position of the check block every pixel in a predetermined vector search range at the interpolated pixel resolution.

More specifically, each time the check block is moved by one pixel, the terminals 126A, 127A of the switching circuits 126, 127 are selected, and interpolator 125 forms interpolated data between the original reference block pixels, which is equivalent to moving the check block by ½ pixel. Each time the check block is moved by a distance corresponding to ½ pixel, the judging circuit 122 compares the evaluation value from the weight adding circuit 121, determines the position of the check block corresponding to the minimum of the evaluation values, generates a motion vector between the reference block and the position of the check block corresponding to minimum of the evaluation values, and supplies the motion vector, having a precision of ½ pixel, to output terminal 123.

FIG. 30 shows another embodiment of a motion vector detecting apparatus according to the present invention which uses an interpolating method for obtaining motion vectors at a precision of ½ pixel. The apparatus of FIG. 30 interpolates the feature values of the small blocks of the check block to obtain a motion vector at a precision of ½ pixel.

Input terminals 132, 134, present frame memory 131, reference frame memory 133, controller 135, small block forming circuits 136, 137, feature extracting circuits 138A, 138B, 139A, 139B, comparison and absolute value summing circuits 140A, 140B, weight adding circuit 141, and judging circuit 142 of FIG. 30 function in generally the same manner as the corresponding elements of FIG. 9. Address moving circuit 144 is operative to supply addresses to the reference frame memory 133 so that the position of the check block is moved in a predetermined vector search range every pixel.

In the embodiment shown in FIG. 30, feature value extracting circuits 139A, 139B supply the feature values of the small blocks in the horizontal and vertical direction of the check block to interpolating circuits 146A, 146B, respectively, and to selectors 147A, 147B, respectively.

Interpolators 146A, 146B are each adapted to interpolate the feature values applied thereto to produce interpolated feature values, and to supply the interpolated feature values to selectors 147A, 147B, respectively.

Selectors 147A, 147B function to supply original and interpolated feature values for the small blocks of a check block to comparison and absolute value summing circuits 140A, 140B. The combination of the original and interpolated feature values produces feature values at a resolution of ½ pixel, which is equivalent to moving the check block by ½ pixel.

The judging circuit 142 compares the evaluation values corresponding to each repositioning of the check block, generates a motion vector at a resolution of ½ pixel, and supplies the motion vector to output terminal 143.

A variation according to the present invention for detecting a motion vector at a precision of ½ pixel is to first find the best matching check block position in the predetermined search range at a precision of one pixel, then to interpolate in the vicinity of the best matching block position, and finally to search in the interpolated range for a new best matching block.

Another variation according to the present invention for detecting a motion vector at a precision of ½ pixel is to first detect a motion vector at a precision of (i) pixels, then to combine the multistep search and the detection of a motion vector at a precision of ½ pixel.

The present invention also encompasses further dividing the small blocks formed in two dimensions, such as vertical and horizontal, obtaining a feature value for each of the further divided small blocks and using the thus obtained feature values to detect a motion vector.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus for detecting motion vectors, comprising:
   first storage means for storing and reading out a reference block having a first size;
   first small block forming means for forming the read out reference block into a first set of small blocks;
   second storage means for storing a search range having a second size at least as large as said first size and for reading out a portion of the stored search range as a check block having said first size in response to a control signal;
   second small block forming means for forming the read out check block into a second set of small blocks;
   means for indicating different portions of said search range stored in said second storage means as said control signal; and
   means for comparing said first and second sets of small blocks to determine which of the check blocks read out from said search range best matches said reference block, and for producing a motion vector between said reference block and the best matching check block.

2. The apparatus of claim 1, wherein said first and second small block forming means are respectively operative to form said first and second sets of small blocks in at least two directions and wherein each block in said first and second sets of small blocks is not square.

3. The apparatus of claim 2, wherein said at least two directions comprise a vertical direction and a horizontal direction.

4. The apparatus of claim 2, wherein said at least two directions comprise a first oblique direction substantially perpendicular to a second oblique direction.

5. The apparatus of claim 2, wherein said small blocks form a grid.

6. The apparatus of claim 2, wherein said first and second small block forming means are respectively operative to divide each of said small blocks formed in one of said at least two directions in at least another of said at least two directions.

7. The apparatus of claim 2, wherein said means for comparing is operative to compare the small blocks formed from said read out reference block in a first direction with the small blocks formed from said read out check block in said first direction, and is also operative to compare the small blocks formed from said read out reference block in a second direction with the small blocks formed from said read out check block in said second direction.

8. The apparatus of claim 7, wherein said means for comparing is operative to weight the comparison of said small blocks in said first direction relative to the comparison of said small blocks in said second direction.

9. The apparatus of claim 1, wherein said means for comparing comprises difference means for obtaining differences between respective small blocks of said first and second sets of small blocks formed from said read out reference and check blocks, absolute value means for obtaining respective absolute values of said differences, and means for summing the absolute values of the differences between said small blocks of said read out reference and check blocks.

10. The apparatus of claim 1, further comprising first feature means for generating at least one first feature value for each of the small blocks in said first set of small blocks, second feature means for generating at least one second feature value for each of the small blocks in said second set of small blocks, and wherein said means for comparing is operative to compare said first and second feature values.

11. The apparatus of claim 10, wherein each of the small blocks formed from said read out reference block and said read out check block comprise pixels; and each of said at least one first and second feature values comprises one of a sum of the pixels in said each of the small blocks, an average of the pixels in said each of the small blocks, minimum and maximum values of the pixels in said each of the small blocks, at least one Hadamard conversion coefficient for the pixels in said each of the small blocks, at least one DCT coefficient for the pixels in said each of the small blocks, at least one wavelet conversion coefficient for the pixels in said each of the small blocks, maximum and minimum values of at least one Hadamard conversion coefficient for the pixels in said each of the small blocks, maximum and minimum values of at least one DCT coefficient for the pixels in said each of the small blocks, and maximum and minimum values of at least one wavelet conversion coefficient for the pixels in said each of the small blocks.

12. The apparatus of claim 10, wherein each of said first and second feature means comprises low pass filter means for low pass filtering said each of said small blocks in said first and second sets of small blocks, respectively.

13. The apparatus of claim 10, wherein said second feature means is operative to modify the feature value for a current one of said small blocks formed from said read out check block to produce the feature value for a next one of said small blocks formed from said read out check block.

14. The apparatus of claim 13, wherein each of the small blocks formed from said read out check block comprise pixels; and said second feature means comprises means for adding a pixel of said next one of said small blocks to said feature value for a current one of said small blocks to produce an intermediate result, and means for subtracting a pixel of said current one of said small blocks from said intermediate result to produce said feature value for said next one of said small blocks.

15. The apparatus of claim 10, wherein said first and second small block forming means are respectively operative to form first and second sets of small blocks in at least two directions; said first and second feature means each comprise first means for generating at least one feature value for each of the small blocks formed in a first direction, and second means for generating at least one feature value for each of the small blocks formed in a second direction; and said means for comparing is operative to compare the small blocks formed from said read out reference block in said first direction with the small blocks formed from said read out check block in said first direction, and is also operative to compare the small blocks formed from said read out reference block in said second direction with the small blocks formed from said read out check block in said second direction.

16. The apparatus of claim 15, wherein said means for comparing is operative to weight the comparison of said small blocks in said first direction relative to the comparison of said small blocks in said second direction.

17. The apparatus of claim 10, further comprising means for interpolating the feature values for said small blocks in said second set of small blocks to produce interpolated feature values, and wherein said means for comparing is operative to compare said feature values for said first set of small blocks with said interpolated feature values for said second set of small blocks so that said motion vector has a resolution of higher than one pixel.

18. The apparatus of claim 1, wherein said search range comprises pixels; said means for indicating different portions of said search range is operative to indicate coarse portions of said search range respectively differing by at least two pixels, and second read control means is operative to indicate fine portions of a subset of said search range respectively differing by one pixel; and said means for producing a motion vector is operative to produce a coarse motion vector in response to the read out check blocks from said coarse portions of said search range and is operative to produce a fine motion vector in response to the read out check blocks from said fine portions of said subset of said search range.

19. The apparatus of claim 18, wherein said means for indicating comprises first read control means for indicating said coarse portions of said search range and second read control means for indicating said fine portions of said subset of said search range.

20. The apparatus of claim 18, further comprising interpolating means for interpolating the portion read out of said subset of said search range to form interpolated data; and wherein said second small block forming means is operative to also form said interpolated data into said second set of small blocks so that said fine motion vector has a resolution of higher than one pixel.

21. The apparatus of claim 1, wherein said search range comprises pixels; and further comprising interpolating means for interpolating the pixels read out of said stored search range to form interpolated pixels; and wherein said second small block forming means is operative to also form said interpolated pixels into said second set of small blocks so that said motion vector has a resolution of higher than one pixel.

22. The apparatus of claim 21, wherein said interpolating means is operative to interpolate two pixels read out of said search range to form one of said interpolated pixels.

23. A method for detecting motion vectors, comprising the steps of:

storing and reading out a reference block having a first size;

forming the read out reference block into a first set of small blocks;

storing a search range having a second size at least as large as said first size;

reading out a portion of the stored search range as a check block having said first size in response to a control signal;

forming the read out check block into a second set of small blocks;

indicating different portions of said search range stored in said second storage means as said control signal;

comparing said first and second sets of small blocks to determine which of the check blocks read out from said search range best matches said reference block; and producing a motion vector between said reference block and the best matching check block.

24. The method of claim 23, wherein said steps of forming form said first and second sets of small blocks in at least two directions, and said step of comparing compares the small blocks formed from said read out reference block in a first direction with the small blocks formed from said read out check block in said first direction, and compares the small blocks formed from said read out reference block in a second direction with the small blocks formed from said read out check block in said second direction, and wherein each block in said first and second sets of small blocks is not square.

25. The method of claim 23, further comprising the steps of generating at least one feature value for each of the small blocks in said first set of small blocks, generating at least one feature value for each of the small blocks in said second set of small blocks, and wherein said step of comparing compares the feature values for said first and second sets of small blocks.

26. The method of claim 25, wherein said steps of forming form said first and second sets of small blocks in at least two directions; each of said steps of generating generates at least one feature value for each of the small blocks formed in a first direction, and at least one feature value for each of the small blocks formed in a second direction; and said step of comparing compares the small blocks formed from said read out reference block in said first direction with the small blocks formed from said read out check block in said first direction, and compares the small blocks formed from said read out reference block in said second direction with the small blocks formed from said read out check block in said second direction.

27. The method of claim 23, wherein said search range comprises pixels; said step of indicating indicates coarse portions of said search range respectively differing by at least two pixels, and fine portions of a subset of said search range respectively differing by one pixel; and said step of producing a motion vector produces a coarse motion vector in response to the check blocks read out from said coarse portions of said search range and produces a fine motion vector in response to the check blocks read out from said fine portions of said subset of said search range.

28. The method of claim 23, wherein said search range comprises pixels; and further comprising the step of interpolating the pixels read out of said stored search range to form interpolated pixels; and wherein said step of forming the read out check block forms said interpolated pixels into said second set of small blocks so that said motion vector has a resolution of higher than one pixel.

* * * * *